US012590193B2

(12) United States Patent
Yoon et al.

(10) Patent No.: US 12,590,193 B2
(45) Date of Patent: *Mar. 31, 2026

(54) PREPARATION METHOD FOR SUPER ABSORBENT POLYMER FILM

(71) Applicant: LG Chem, Ltd., Seoul (KR)

(72) Inventors: Kiyoul Yoon, Daejeon (KR); Seongkyun Kang, Daejeon (KR); Yu Jin Kim, Daejeon (KR); Gicheul Kim, Daejeon (KR); Hyosook Joo, Daejeon (KR); Hyeon Choi, Daejeon (KR); Se Yeol Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 719 days.

This patent is subject to a terminal disclaimer.

(21) Appl. No.: 17/797,004

(22) PCT Filed: Mar. 23, 2021

(86) PCT No.: PCT/KR2021/003546
§ 371 (c)(1),
(2) Date: Aug. 2, 2022

(87) PCT Pub. No.: WO2021/194203
PCT Pub. Date: Sep. 30, 2021

(65) Prior Publication Data
US 2023/0071674 A1    Mar. 9, 2023

(30) Foreign Application Priority Data

| Mar. 23, 2020 | (KR) | ........................ | 10-2020-0035146 |
| Aug. 14, 2020 | (KR) | ........................ | 10-2020-0102565 |
| Aug. 21, 2020 | (KR) | ........................ | 10-2020-0105630 |
| Aug. 26, 2020 | (KR) | ........................ | 10-2020-0107983 |
| Mar. 22, 2021 | (KR) | ........................ | 10-2021-0036932 |

(51) Int. Cl.
| C08J 5/18 | (2006.01) |
| B01J 20/26 | (2006.01) |
| B01J 20/28 | (2006.01) |
| B01J 20/30 | (2006.01) |
| B01J 20/32 | (2006.01) |
| C08F 2/44 | (2006.01) |
| C08F 2/50 | (2006.01) |
| C08F 20/06 | (2006.01) |
| C08J 3/075 | (2006.01) |
| C08J 3/24 | (2006.01) |

(52) U.S. Cl.
CPC .............. *C08J 5/18* (2013.01); *B01J 20/267* (2013.01); *B01J 20/28033* (2013.01); *B01J 20/28085* (2013.01); *B01J 20/3064* (2013.01); *B01J 20/3078* (2013.01); *B01J 20/3282* (2013.01); *C08F 2/44* (2013.01); *C08F 2/50* (2013.01); *C08F 20/06* (2013.01); *C08J 3/075* (2013.01); *C08J 3/242* (2013.01); *B01J 2220/68* (2013.01); *C08J 2333/02* (2013.01)

(58) Field of Classification Search
CPC ..... C08J 5/18; C08J 3/075; C08J 3/242; B01J 20/267; B01J 20/28033; B01J 20/28085; B01J 20/3064; B01J 20/3078; B01J 20/3282; C08F 2/44; C08F 2/50; C08F 2/06
See application file for complete search history.

(56) References Cited

U.S. PATENT DOCUMENTS

| 5,087,513 | A | 2/1992 | Kim |
| 6,096,014 | A | 8/2000 | Haffner et al. |
| 6,686,414 | B1 | 2/2004 | Anderson et al. |
| 6,852,813 | B2 | 2/2005 | Darlington, Jr. et al. |
| 9,950,308 | B2 | 4/2018 | Lee et al. |
| 2003/0134102 | A1 | 7/2003 | Wang et al. |
| 2004/0110914 | A1 | 6/2004 | Nakahara et al. |
| 2004/0116287 | A1 | 6/2004 | Wang et al. |
| 2005/0031852 | A1 | 2/2005 | Schmidt et al. |
| 2005/0137085 | A1 | 6/2005 | Zhang et al. |
| 2005/0256758 | A1 | 11/2005 | Sierra et al. |
| 2007/0088106 | A1 | 4/2007 | Schlesiger et al. |
| 2008/0058747 | A1 | 3/2008 | Singh Kainth et al. |
| 2010/0100066 | A1 | 4/2010 | Azad et al. |
| 2010/0294988 | A1 | 11/2010 | Stueven et al. |

(Continued)

FOREIGN PATENT DOCUMENTS

| CN | 101243131 A | 8/2008 |
| CN | 102186508 A | 9/2011 |

(Continued)

OTHER PUBLICATIONS

International Search Report for Application No. PCT/KR2021/003546 mailed Jul. 8, 2021, 4 pages.
Odian, G. "Principles of Polymerization" Dec. 1981, p. 203, John Wiley & Sons, Inc.
Schwalm, R. "UV Coatings: Basics, Recent Developments and New Applications," Dec. 2006, p. 115, Elsevier.
Extended European Search Report including Written Opinion for Application No. 21777103.9 dated May 22, 2023, pp. 1-8.
Britannica, The Editors of Encyclopaedia. "strength of materials". Encyclopedia Britannca, Oct. 7, 2022, <https://www.britannica.com/technology/strength-of-materials.> (Year: 2022).

(Continued)

*Primary Examiner* — Yong L Chu
(74) *Attorney, Agent, or Firm* — Lerner David LLP

(57) ABSTRACT

The present disclosure relates to a preparation method for a super absorbent polymer film. Specifically, it relates to a preparation method for a new type of super absorbent polymer film, which is thin and exhibits excellent absorption performance. In addition, the super absorbent polymer film of the present disclosure has excellent flexibility and excellent mechanical properties, is free from scattering or leaking, and does not require an auxiliary substance such as pulp, so that products can be made thinner and the manufacturing process and costs may be reduced.

20 Claims, No Drawings

(56) References Cited

U.S. PATENT DOCUMENTS

| | | | |
|---|---|---|---|
| 2011/0012057 A1 | 1/2011 | Lindner et al. | |
| 2011/0172507 A1 | 7/2011 | Lademann et al. | |
| 2011/0301027 A1 | 12/2011 | Bitis et al. | |
| 2012/0157623 A1 | 6/2012 | Lindner et al. | |
| 2012/0271260 A1 | 10/2012 | Azad et al. | |
| 2012/0309890 A1 | 12/2012 | Haberle et al. | |
| 2013/0175472 A1 | 7/2013 | Tian et al. | |
| 2014/0127510 A1 | 5/2014 | Handa et al. | |
| 2014/0242371 A1 | 8/2014 | Hatanaka et al. | |
| 2014/0276513 A1 | 9/2014 | MacDonald et al. | |
| 2015/0252130 A1 | 9/2015 | Loick et al. | |
| 2015/0314034 A1 | 11/2015 | Horner et al. | |
| 2016/0367717 A1* | 12/2016 | Hinayama | C08F 120/06 |
| 2017/0281422 A1 | 10/2017 | Herfert et al. | |
| 2018/0265646 A1 | 9/2018 | Nam et al. | |
| 2018/0305523 A1 | 10/2018 | Kamphus et al. | |
| 2019/0099739 A1* | 4/2019 | Lee | C08F 20/06 |
| 2020/0002445 A1 | 1/2020 | Chiba et al. | |
| 2020/0023625 A1 | 1/2020 | Torii et al. | |
| 2020/0164345 A1 | 5/2020 | Yoon et al. | |
| 2020/0270403 A1 | 8/2020 | Nam et al. | |
| 2020/0384441 A1* | 12/2020 | Yoon | C08F 220/06 |
| 2020/0398251 A1 | 12/2020 | Choi et al. | |
| 2021/0022932 A1 | 1/2021 | Ito et al. | |
| 2021/0147640 A1 | 5/2021 | Hur et al. | |
| 2021/0179790 A1 | 6/2021 | Lee et al. | |
| 2022/0023114 A1 | 1/2022 | Ito | |
| 2022/0362743 A1 | 11/2022 | Yoon et al. | |
| 2023/0067846 A1 | 3/2023 | Yoon et al. | |
| 2023/0071674 A1 | 3/2023 | Yoon et al. | |
| 2023/0225916 A1 | 7/2023 | Yoon et al. | |
| 2023/0249155 A1 | 8/2023 | Min et al. | |
| 2024/0091075 A1 | 3/2024 | Yoon et al. | |

FOREIGN PATENT DOCUMENTS

| | | | |
|---|---|---|---|
| CN | 105408365 A | 3/2016 | |
| CN | 107429035 A | 12/2017 | |
| CN | 107964077 A | 4/2018 | |
| CN | 110325273 A | 10/2019 | |
| CN | 110423308 A | 11/2019 | |
| EP | 3708608 A1 | 9/2020 | |
| EP | 4074762 A1 | 10/2022 | |
| EP | 4074763 A1 | 10/2022 | |
| EP | 4074764 A1 | 10/2022 | |
| JP | H0791397 B2 | 10/1995 | |
| JP | H08073507 A | 3/1996 | |
| JP | H09183856 A | 7/1997 | |
| JP | H10018125 A | 1/1998 | |
| JP | H10076589 A | 3/1998 | |
| JP | 2001278998 A | 10/2001 | |
| JP | 2003221783 A | 8/2003 | |
| JP | 2004536626 A | 12/2004 | |
| JP | 3620866 B2 | 2/2005 | |
| JP | 3632803 B2 | 3/2005 | |
| JP | 2006016719 A | 1/2006 | |
| JP | 2006131767 A | 5/2006 | |
| JP | 2010185029 A | 8/2010 | |
| JP | 2010241975 A | 10/2010 | |
| JP | 4721780 B2 | 7/2011 | |
| JP | 2013049868 A | 3/2013 | |
| JP | 2016508167 A | 3/2016 | |
| JP | 2018030308 A | 3/2018 | |
| KR | 20000069741 A | 11/2000 | |
| KR | 2001-0033740 A | 4/2001 | |
| KR | 20010102350 A | 11/2001 | |
| KR | 20040070245 A | 8/2004 | |
| KR | 20080034470 A | 4/2008 | |
| KR | 20140056225 A | 5/2014 | |
| KR | 101448225 B1 | 10/2014 | |
| KR | 20160062900 A | 6/2016 | |
| KR | 101647166 B1 | 8/2016 | |
| KR | 20170005628 A | 1/2017 | |
| KR | 101832549 B1 | 2/2018 | |
| KR | 20180074384 A | 7/2018 | |
| KR | 2019-0020911 A | 3/2019 | |
| KR | 20190071619 A | 6/2019 | |
| KR | 20190088830 A | 7/2019 | |
| KR | 20200004663 A | 1/2020 | |
| KR | 20200041644 A | 4/2020 | |
| WO | 9933654 A1 | 7/1999 | |
| WO | 0050096 A1 | 8/2000 | |
| WO | 2002078756 A1 | 10/2002 | |
| WO | 2018037816 A1 | 3/2018 | |
| WO | 2018159803 A1 | 9/2018 | |

OTHER PUBLICATIONS

Extended European Search Report including Written Opinion for Application No. 21775421.7 dated May 19, 2023, pp. 1-10.

Extended European Search Report including Written Opinion for Application No. 21776780.5 dated Dec. 22, 2022, pp. 1-10.

International Search Report for Application No. PCT/KR2021/003545 mailed Jul. 2, 2021, pp. 1-5.

International Search Report for PCT/KR2021/003544 dated Jul. 2, 2021. 5 pgs.

Odian, George, "Principles of polymerization", 2nd ed., Wiley-Interscience New York, Oct. 1981.3 pgs.

Psgtechs Coe Indutech, "Harmonized Test Methods Nonwovens and Related Industries" (Year: 2019).

Schwalm, Reinhold, "UV Coatings: Basics, Recent Developments and New Applications", Elsevier Science (Dec. 2006). 3 pgs.

* cited by examiner

PREPARATION METHOD FOR SUPER ABSORBENT POLYMER FILM

CROSS-REFERENCE TO RELATED APPLICATION(S)

The present application is a national stage entry under 35 U.S.C. § 371 of International Application No. PCT/KR2021/003546 filed on Mar. 23, 2021, which claims priority from Korean Patent Applications No. 10-2020-0035146 filed on Mar. 23, 2020, No. 10-2020-0102565 filed on Aug. 14, 2020, No. 10-2020-0105630 filed on Aug. 21, 2020, No. 10-2020-0107983 filed on Aug. 26, 2020, and No. 10-2021-0036932 filed on Mar. 22, 2021, all the disclosures of which are incorporated herein by reference.

TECHNICAL FIELD

The present disclosure relates to a preparation method for a super absorbent polymer film.

BACKGROUND OF ART

A super absorbent polymer (SAP) is a type of synthetic polymeric material capable of absorbing 500 to 1000 times its own weight of moisture. Various manufacturers have denominated it with different names, such as SAM (Super Absorbency Material), AGM (Absorbent Gel Material), and the like. Such super absorbent polymers started to be practically applied in sanitary products, and they are now being widely used not only for hygiene products such as disposable diapers for children, sanitary napkins, etc., but also for water retaining soil products for gardening, water stop materials for the civil engineering and construction, sheets for raising seedling, fresh-keeping agents for food distribution fields, materials for poultices, or the like.

In general, hygiene products such as various diapers, sanitary napkins, or pads for urinary incontinence include an absorber containing super absorbent polymer particles. It was common that the absorber mainly includes the super absorbent polymer particles and fluff pulp to properly fasten the super absorbent polymer particles while maintaining the shape of the absorber and hygiene products.

However, due to the presence of the fluff pulp, it was difficult to make the absorber and hygiene products slim and thin, and there was a problem such as poor wearability in which wearer's skin against the hygiene product becomes sweaty. Moreover, since the fluff pulp is mainly obtained from wood as a raw material, it has been contrary to the recent environmental protection trend, and the use of the fluff pulp has become one of the main reasons of increasing manufacturing costs of sanitary products.

In addition, current super absorbent polymers are mostly manufactured and used in the form of powder. This powder-type super absorbent polymer has limitation in the range of use and thinning, because it may be scattered or leaked when manufacturing sanitary materials or in actual use and should be used with a specific type of substrate. Further, since absorption performance of the absorber may vary depending on the content distribution of the super absorbent polymer particles, it is difficult to uniformly control the absorption characteristics.

Meanwhile, in order to solve the above problems, a sheet-type super absorbent polymer has been proposed.

For example, a method for preparing a sheet-type super absorbent polymer by kneading an acrylic acid-based monomer or pulverizing a hydrogel polymer obtained after polymerization to obtain a particulate hydrogel polymer, followed by molding is known. However, since a diameter of the hydrogel polymer particles is about 0.2 to 2.0 mm, the above method had a limitation in providing an ultra-thin sheet having a thickness of 0.5 mm or less, and there was a problem in that an auxiliary substance such as fluff pulp is still required to secure shape retention and absorbency.

Accordingly, there is a need for research on a new type of super absorbent polymer, which does not require an auxiliary substance such as fluff pulp, can be reduced in thickness, and exhibits excellent absorption properties, and a preparation method of the same.

PRIOR ART DOCUMENTS

Patent Document 1: Japanese Patent Application Laid-Open No. Hei 08-73507
Patent Document 2: Japanese Patent Application Laid-Open No. Hei 09-183856

DETAILED DESCRIPTION OF THE INVENTION

Technical Problem

In order to solve the above problems, there is provided a preparation method for a film-type super absorbent polymer capable of replacing the existing powder-type super absorbent polymer.

Technical Solution

According to an embodiment of the present disclosure, there is provided a preparation method for a super absorbent polymer film, including the steps of:

preparing a monomer composition by mixing an acrylic acid-based monomer having at least partially neutralized acidic groups, a cellulose-based thickener, a moisturizing agent, a polymerization initiator, and a solvent;

casting the monomer composition on a substrate to form a monomer composition film;

forming a hydrogel polymer film by irradiating heat and/or light while drawing the monomer composition film; and drying the hydrogel polymer film.

The monomer composition may further contain an internal cross-linking agent.

The cellulose-based thickener may be at least one selected from the group consisting of nanocellulose, hydroxyethylcellulose, hydroxypropylcellulose, hydroxyethylmethylcellulose, hydroxypropylmethylcellulose, and sodium carboxymethylcellulose.

The moisturizing agent may be at least one selected from the group consisting of glycerin; diglycerin; ethylene glycol; propylene glycol; butylene glycol; sorbitol; polyethylene glycol; polyglycerin-3; polyglycerin-6; polyglycerin-10; an ester compound of polyglycerin-10 and a C3 to C18 saturated fatty acid; citric acid; triethyl citrate; methyl citrate; sodium citrate; and trisodium 2-methylcitrate.

The cellulose-based thickener may be contained in an amount of 0.01 to 5 parts by weight based on 100 parts by weight of the solid content in the monomer composition.

The moisturizing agent may be contained in an amount of 5 to 70 parts by weight based on 100 parts by weight of the acrylic acid-based monomer.

The monomer composition may further contain a polyether-modified siloxane-based surfactant having a polyethylene oxide group and/or a polypropylene oxide group.

The monomer composition may further contain at least one foaming agent selected from the group consisting of expandable microsphere, expanded microsphere, an azo compound, and an inorganic foaming agent.

The monomer composition may have a viscosity at 25° C. of 100 mPa·s or more.

The monomer composition film may have a moisture content of 30 wt % to 60 wt %.

Tension applied to the monomer composition film in the step of forming the hydrogel polymer film may be 40 to 100 N/m.

The step of forming the hydrogel polymer film may be performed at a temperature of 40 to 90° C.

The drying step may be performed at a temperature of 80 to 150° C.

The super absorbent polymer film obtained after the drying step may have a moisture content of 15% or less.

The preparation method may further include the steps of: applying a surface cross-linking solution containing a surface cross-linking agent to a surface of the super absorbent polymer film; and performing surface modification by heating the super absorbent polymer film coated with the surface cross-linking solution; after the drying step.

At this time, an amount of the surface cross-linking agent applied to the surface of the super absorbent polymer film may be 0.05 g/m$^2$ to 2.0 g/m$^2$.

Advantageous Effects

According to the present disclosure, it is possible to prepare a super absorbent polymer film having excellent absorption performance and high flexibility while being thin.

The super absorbent polymer film prepared according to the present disclosure can be manufactured into a product without scattering or leaking, and an auxiliary substance such as fluff pulp is unnecessary, so that it is possible to make products thinner and to reduce the manufacturing process and costs.

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed and it should be understood that the present invention includes all modifications, equivalents, and replacements within the idea and technical scope of the present invention.

Hereinafter, the present disclosure will be described in detail.

In the present disclosure, there is provided a preparation method for a super absorbent polymer in the form of a film, which has excellent absorbency, can be used as an absorber by itself without an auxiliary substance such as pulp, and is free from scattering and leaking.

In general, the super absorbent polymer is obtained by polymerizing an acrylic acid-based monomer in the presence of an internal cross-linking agent to obtain a hydrogel polymer, and then drying, pulverizing and classifying the hydrogel polymer to prepare a base resin, followed by performing surface modification. The super absorbent polymer prepared in this way is in the form of a powder having a particle size of about 200 to 600 μm, and is mixed and compounded with an auxiliary substance such as fluff pulp to be applied to the product.

However, the powder-type super absorbent polymer may scatter or leak from the product during the manufacturing process of an absorbent core, and it is difficult to uniformly disperse the polymer in the product, making it difficult to uniformly control absorption performance. In addition, it requires an auxiliary substance, so that there is a limitation in thinning the product.

In addition, it is known that the existing sheet-type super absorbent polymer is manufactured by rolling a powder- or particulate-type super absorbent polymer or fixing the super absorbent polymer to a support such as a non-woven fabric for shape retention. However, the sheet-type super absorbent polymer prepared in this method has low process efficiency due to a complicated manufacturing method, and requires a lot of components other than the super absorbent polymer to be fixed to the support. Therefore, there is a limitation in increasing the content of the super absorbent polymer present in the final product, and absorption property is not good. In addition, even when a powder- or particulate-type super absorbent polymer or a particulate-type hydrogel polymer is rolled to form a sheet, it is necessary to undergo a mixing process with a molding agent and a molding process after polymerization of the monomer. Thus, the manufacturing method is complicated and there is a limitation in thinning the product. Further, in order to bind the super absorbent polymer and form a sheet, it is necessary to include a molding auxiliary substance such as fiber or pulp, so that the absorption property is also poor.

Accordingly, the present inventors have conducted a research on a new type of super absorbent polymer that does not require an auxiliary substance such as pulp, can be thinned, does not scatter, and can be used as an absorber by itself, resulting in the present invention.

The super absorbent polymer film prepared according to the present disclosure is in the form of a thin film rather than a powder, so there is no risk of scattering or leaking from the product during handling, and can be used without a separate auxiliary substance such as fluff pulp, and exhibits excellent absorption properties by itself.

In the present disclosure, the super absorbent polymer film refers to a super absorbent polymer in the form of a flexible and thin layer or film having a moisture content of 15 wt % or less, or 14 wt % or less, preferably 13 wt % or less. Preferably, the moisture content of the super absorbent polymer film is 15 wt % or less, 14 wt % or less, 13 wt % or less, or 12 wt % or less, and 1 wt % or more, 2 wt % or more, 4 wt % % or more, or 6 wt % or more.

Meanwhile, the "moisture content" in the present disclosure indicates the amount of moisture contained in the sample as a percentage with respect to the weight of the sample before drying. That is, the moisture content can be calculated by dividing a value obtained by subtracting the weight after drying of the sample from the weight before drying of the sample by the weight before drying of the sample, and then multiplying by 100. At this time, the drying condition for measuring the moisture content is that the temperature is increased to about 150° C. and maintained at 150° C., and the total drying time is 20 min including 5 min of a heating step.

The super absorbent polymer film prepared according to an embodiment of the present disclosure may have a moisture content of 15% or less, and may be in the form of a colorless, transparent, elastic, and flexible film.

The transparent super absorbent polymer film means that a total light transmittance with respect to visible light is 89.5% or more when the thickness is in the range of 0.001 to 0.5 mm. The total light transmittance of the super absorbent polymer film according to the embodiment of the present disclosure may be 90% or more, 90.4% or more, 91% or more, 91.5% or more, or 92% or more. The total light transmittance may be theoretically 100%, for example, it may be 99% or less.

In addition, the super absorbent polymer film of the present disclosure may have a yellow index of 2.6 or less, 2.5 or less, 2.4 or less, 2.3 or less, 1.9 or less, 1.5 or less, or 1.3 or less, when measured in accordance with ASTM D1925 with a thickness of 0.001 to 0.5 mm.

The preparation method for a super absorbent polymer film according to an embodiment of the present disclosure includes the following steps:

preparing a monomer composition by mixing an acrylic acid-based monomer having at least partially neutralized acidic groups, a cellulose-based thickener, a moisturizing agent, a polymerization initiator, and a solvent;

casting the monomer composition on a substrate to form a monomer composition film;

forming a hydrogel polymer film by irradiating heat and/or light while drawing the monomer composition film; and drying the hydrogel polymer film.

In the present disclosure, a monomer composition film is prepared from a monomer composition solution having a controlled viscosity by a solution casting method, and the film is polymerized and dried to prepare a super absorbent polymer in the form of a film.

In particular, in the present disclosure, the thickness and mechanical properties of the super absorbent polymer film to be prepared can be adjusted by applying tension to the monomer composition film in the polymerization step, followed by drawing.

In the preparation method of the present disclosure, the monomer composition, which is a raw material of the super absorbent polymer, contains an acrylic acid-based monomer having at least partially neutralized acidic groups, a cellulose-based thickener, a moisturizing agent, a polymerization initiator, and a solvent.

First, the acrylic acid-based monomer is a compound represented by the following Chemical Formula 1:

$$R^1—COOM^1 \qquad \text{[Chemical Formula 1]}$$

in Chemical Formula 1, $R^1$ is a C2 to C5 alkyl group having an unsaturated bond, and $M^1$ is a hydrogen atom, a monovalent or divalent metal, an ammonium group, or an organic amine salt.

Preferably, the acrylic acid-based monomer includes at least one selected from the group consisting of acrylic acid, methacrylic acid, and a monovalent metal salt, a divalent metal salt, an ammonium salt, and an organic amine salt thereof.

Herein, the acrylic acid-based monomers may be those having acidic groups which are at least partially neutralized. Preferably, the acrylic acid-based monomer partially neutralized with an alkali substance such as sodium hydroxide, potassium hydroxide, ammonium hydroxide, or the like may be used. A degree of neutralization of the acrylic acid-based monomer may be 40 to 95 mol %, 40 to 80 mol %, or 45 to 75 mol %. The range of the degree of neutralization can be adjusted according to final properties. An excessively high degree of neutralization causes the neutralized monomers to be precipitated, and thus polymerization may not readily occur, whereas an excessively low degree of neutralization may deteriorate the absorbency of the polymer.

In a preferred embodiment, sodium hydroxide (NaOH), potassium hydroxide (KOH), or a combination thereof may be used as the alkali substance. In particular, when potassium hydroxide is used as the alkali substance, a super absorbent polymer film having better flexibility and dimensional stability can be prepared.

The concentration of the acrylic acid-based monomer may be about 20 to about 60 wt %, preferably about 40 to about 50 wt %, based on the monomer composition including the raw materials of the super absorbent polymer and the solvent, and it may be appropriately selected in consideration of the reaction time and the reaction conditions. However, when the concentration of the monomer is excessively low, the yield of the super absorbent polymer is low and there may be a problem in economic efficiency. In contrast, when the concentration is excessively high, a problem may occur in the process such as some of the monomer is precipitated, and thus physical properties of the super absorbent polymer may be deteriorated.

Meanwhile, in the present disclosure, a thickener and a moisturizing agent are contained in the monomer composition so that the monomer composition can be applied in the form of a film by a solution casting method.

As the thickener and the moisturizing agent are contained at the same time, the monomer composition of the present disclosure may exhibit a viscosity suitable for casting in the form of a film, can maintain an appropriate moisture content in the polymerization process after film casting, and the super absorbent polymer film to be prepared may have high flexibility.

In the present disclosure, a cellulose-based thickener is used as the thickener, and specifically, at least one selected from the group consisting of nanocellulose, hydroxyethylcellulose, hydroxypropylcellulose, hydroxyethylmethylcellulose, hydroxypropylmethylcellulose, and sodium carboxymethylcellulose may be used. Preferably, nanocellulose, hydroxyethylcellulose, sodium carboxymethylcellulose, or a combination thereof may be used.

The cellulose-based thickener may be contained in an amount of 0.01 parts by weight or more, 0.1 parts by weight or more, 0.2 parts by weight or more, or 0.4 parts by weight or more, and 5 parts by weight or less, 3 parts by weight or less, 1 parts by weight or less, or 0.9 parts by weight or less based on 100 parts by weight of the solid content in the monomer composition.

Herein, the solid content in the monomer composition means all components of the composition excluding the solvent. That is, the solid content means the total content of an acrylic acid-based monomer, an alkali substance for neutralizing the acrylic acid-based monomer, a cellulose-based thickener, a moisturizing agent, a cross-linking agent, a thermal initiator, a photoinitiator, an internal cross-linking agent, and other additives.

If the content of the cellulose-based thickener is less than 0.01 parts by weight based on 100 parts by weight of the solid content in the monomer composition, sufficient thickening effect cannot be ensured, so it may be difficult to prepare a monomer composition film. Conversely, if it exceeds 5 parts by weight, the viscosity of the monomer composition becomes excessively high, so that the thickness of the film becomes thick, and it may be difficult to uniformly control the thickness of the film.

As the moisturizing agent, a substance normally used as a moisturizing component in pharmaceuticals, cosmetics, chemical products, and the like may be used without limitation. Examples of the moisturizing agent include at least one selected from the group consisting of polyhydric alcohols having two or more hydroxyl groups in a molecule, citric acid, and citrate.

Specifically, as the polyhydric alcohol, a C3 to C30 polyhydric alcohol having 3 to 12 hydroxyl groups in a molecule may be used. For example, the polyhydric alcohol may be at least one selected from the group consisting of glycerin; diglycerin; ethylene glycol; propylene glycol; butylene glycol; sorbitol; polyethylene glycol; polyglycerin-3; polyglycerin-6; polyglycerin-10; and an ester compound of polyglycerin-10 and a C3 to C18 saturated fatty acid (e.g., polyglyceryl-10 distearate, polyglyceryl-10 oleate, polyglyceryl-10 laurate, etc.). Among them, at least one selected from the group consisting of glycerin, diglycerin, propylene glycol, and sorbitol may be preferably used.

In addition, citric acid and/or citrate may also be used as the moisturizing agent. Examples of the citrate include triethylcitrate, methylcitrate, sodium citrate, trisodium 2-methylcitrate, and the like.

The moisturizing agent may be used in an amount of 5 parts by weight or more, 10 parts by weight or more, 20 parts by weight or more, or 30 parts by weight or more, and 70 parts by weight or less, 60 parts by weight or less, or 50 parts by weight or less based on 100 parts by weight of the acrylic acid-based monomer.

If the content of the moisturizing agent is less than 5 parts by weight based on 100 parts by weight of the acrylic acid-based monomer, the moisture content of the monomer composition film is not sufficient, so that the film may dry out or crumble in the subsequent polymerization and drying process and flexibility of the super absorbent polymer film to be prepared cannot be achieved. Conversely, if the content of the polyhydric alcohol exceeds 70 parts by weight based on 100 parts by weight of the acrylic acid-based monomer, there may be a problem in that absorbency of the super absorbent polymer film is reduced. Therefore, the content of the moisturizing agent preferably satisfies the above range.

The monomer composition may optionally contain an internal cross-linking agent for cross-linking the polymer. As the internal cross-linking agent, those used in the manufacture of existing super absorbent polymers may be used. The internal cross-linking agent may be a cross-linking agent having one or more ethylene-based unsaturated groups in addition to one or more functional groups which may react with a water-soluble substituent of the acrylic acid-based monomer; or a cross-linking agent having two or more functional groups which may react with a water-soluble substituent of the monomer and/or a water-soluble substituent formed by hydrolysis of the monomer.

As the specific example of the internal cross-linking agent, a C8-C12 bisacrylamide, bismethacrylamide, a poly (meth)acrylate of C2-C10 polyol, a poly(meth)allylether of C2-C10 polyol, or the like may be used. More specifically, at least one selected from the group consisting of N,N'-methylenebis(meth)acrylate, ethyleneoxy(meth)acrylate, polyethyleneoxy(meth)acrylate, propyleneoxy(meth)acrylate, glycerin diaciylate, glycerin triacrylate, trimethylol triacrylate, polyethylene glycol diacrylate, triallylamine, triaryl cyanurate, triallyl isocyanate, polyethylene glycol, diethylene glycol and propylene glycol may be used. In one embodiment, polyethylene glycol diacrylate may be used as the internal cross-linking agent.

This internal cross-linking agent may be contained in a concentration of 3000 ppm or less with respect to the monomer composition, so that the polymerized polymer can be cross-linked. In one embodiment, the internal cross-linking agent may be contained in 10 ppm or more, 50 ppm or more, or 100 ppm or more, and 3000 ppm or less, 2500 ppm or less, or 2000 ppm or less.

The polymerization initiator used in the preparation method of the super absorbent polymer film is not particularly limited as long as it is generally used for the preparation of a super absorbent polymer.

Specifically, the polymerization initiator may be an initiator for thermal polymerization or an initiator for photopolymerization by UV radiation according to the polymerization method. However, even when the photopolymerization method is applied thereto, a certain amount of heat is generated by UV radiation and the like, and some heat occurs as the polymerization reaction, an exothermal reaction, progresses. Therefore, the composition may additionally include the thermal polymerization initiator. In a preferred embodiment, a photopolymerization initiator and a thermal polymerization initiator may be used simultaneously as the polymerization initiator.

Herein, any compound which can form a radical by light such as UV rays may be used as the photopolymerization initiator without limitation.

For example, the photopolymerization initiator may be one or more compounds selected from the group consisting of benzoin ether, dialkyl acetophenone, hydroxyl alkylketone, phenyl glyoxylate, benzyl dimethyl ketal, acyl phosphine, and α-aminoketone. Further, as the specific example of acyl phosphine, commercial lucirin TPO(2,4,6-Trimethylbenzoyldiphenylphosphine oxide), Irgacure 819(Phenylbis(2,4,6-trimethylbenzoyl)phosphine oxide), and the like may be used. More various photopolymerization initiators are well disclosed in "UV Coatings: Basics, Recent Developments and New Application (Elsevier, 2007)" written by Reinhold Schwalm, p 115, and the present disclosure is not limited thereto.

A concentration of the photopolymerization initiator in the monomer composition may be 10 ppm or more, 20 ppm or more, or 40 ppm or more, and 2000 ppm or less, 1000 ppm or less, 500 ppm or less, or 100 ppm or less. If the concentration of the photopolymerization initiator is excessively low, the polymerization rate may become slow, and if the concentration is excessively high, the molecular weight of the super absorbent polymer may become low and properties may be uneven.

Furthermore, as the thermal polymerization initiator, one or more initiators selected from the group consisting of a persulfate-based initiator, an azo-based initiator, hydrogen peroxide, and ascorbic acid may be used. Specifically, sodium persulfate ($Na_2S_2O_8$), potassium persulfate ($K_2S_2O_8$), ammonium persulfate (($NH_4$)$_2S_2O_8$), and the like may be used as examples of the persulfate-based initiators; and 2,2-azobis(2-amidinopropane) dihydrochloride, 2,2- azobis-(N,N-dimethylene)isobutyramidine dihydrochloride, 2-(carbamoylazo)isobutylonitril, 2,2-azobis[2-(2-imidazolin-2-yl)propane]dihydrochloride, 4,4-azobis-(4-cyanovaleric acid), and the like may be used as examples of azo-based initiators. More various thermal polymerization initiators are well disclosed in "Principle of Polymerization (Wiley, 1981)" written by Odian, p 203, and the present disclosure is not limited thereto.

A concentration of the thermal polymerization initiator in the monomer composition may be 10 ppm or more, 100 ppm or more, or 500 ppm or more, and 2000 ppm or less, 1500 ppm or less, or 1000 ppm or less. If the concentration of the thermal polymerization initiator is excessively low, additional thermal polymerization hardly occurs and the effect of adding the thermal polymerization initiator may be insufficient. If the concentration of the thermal polymerization initiator is excessively high, the molecular weight of the super absorbent polymer may become low and the properties may be uneven.

In the preparation method of the present disclosure, the monomer composition may further contain a surfactant, a foaming agent, a plasticizer, a preservation stabilizer, an antioxidant, or the like, if necessary.

The surfactant may be added to further facilitate casting of the monomer composition. A polyether-modified siloxane-based surfactant may be used as the surfactant, and containing this allows the monomer composition to be casted to a uniform thickness. Even when applied to a continuous process such as a roll-to-roll process, a super absorbent polymer film with uniform quality can be manufactured at a high speed without a separate process.

The polyether-modified siloxane-based surfactant is a surfactant having a polyether chain at the terminal and/or side chain of polysiloxane main chain. For example, the polyether-modified siloxane-based surfactant may have a polyethylene oxide group and/or a polypropylene oxide group.

As the polyether-modified siloxane-based surfactant, a commercially available material may be used. For example, at least one selected from the group consisting of BYK-345, BYK-346, BYK-347, BYK-348, BYK-349, BYK-3450, BYK-3455, BYK-3456, BYK-3560, BYK-3565, and BYK-3760 may be used.

The content of the polyether-modified siloxane-based surfactant may be 0.05 to 0.5 parts by weight, or 0.1 parts by weight or more, 0.15 parts by weight or more, or 0.2 parts by weight or more, and 0.45 parts by weight or less, 0.4 parts by weight or less, or 0.35 parts by weight or less, based on 100 parts by weight of the monomer composition.

If the content of the polyether-modified siloxane-based surfactant is less than 0.05 parts by weight based on 100 parts by weight of the monomer composition, the effect of improving coating properties of the above-described monomer composition cannot be achieved. If it exceeds 0.5 parts by weight, basic absorption properties (initial absorbency, absorbency at atmospheric pressure, etc.) of the super absorbent polymer film to be prepared may be deteriorated. Therefore, it is preferable to include the polyether-modified siloxane-based surfactant in the above-mentioned range so as not to deteriorate overall physical properties of the super absorbent polymer film to be finally prepared while exhibiting excellent coating properties to be suitable for a roll-to-roll process, and the like.

Meanwhile, in order to improve the initial absorption rate of the super absorbent polymer film, the monomer composition may optionally further contain a foaming agent.

The foaming agent may be foamed during polymerization and/or drying, and may be, for example, at least one selected from the group consisting of expandable microsphere, expanded microsphere, an azo compound, and an inorganic foaming agent. These foaming agents form a large number of pores in the super absorbent polymer film, and thus the initial absorbency of the super absorbent polymer film can be greatly improved.

The expandable microsphere may have a structure having a core containing hydrocarbon, and a shell surrounding the core and containing a thermoplastic resin.

The hydrocarbon constituting the core of the expandable microsphere may be at least one selected from the group consisting of n-propane, n-butane, iso-butane, cyclobutane, n-pentane, iso-pentane, cyclopentane, n-hexane, iso-hexane, cyclohexane, n-heptane, iso-heptane, cycloheptane, n-octane, iso-octane and cyclooctane. Among them, a C3 to C5 hydrocarbon (n-propane, n-butane, iso-butane, cyclobutane, n-pentane, iso-pentane, cyclopentane) may be suitable.

In addition, the thermoplastic resin constituting the shell of the expandable microsphere may be a polymer formed from at least one monomer selected from the group consisting of (meth)acrylate, (meth)acrylonitrile, aromatic vinyl, vinyl acetate, vinyl halide and vinylidene halide. Among them, a copolymer of (meth)acrylate and (meth)acrylonitrile, or a (meth)acrylate homopolymer is most suitable for achieving the initial absorbency within the above-described range.

The expandable microsphere is a foaming agent which expands by supplying heat, and may expand under high-temperature conditions in the polymerization and/or drying step of monomers to form pores in the super absorbent polymer film. This expandable microsphere may have expansion properties which may vary depending on components constituting the core and the shell, weights of the respective components, and particle sizes thereof. By adjusting these factors, it is possible to expand pores to a desired size and to control a pore structure of the super absorbent polymer film.

The expandable microspher may have an average particle diameter (D50) before expansion of 2 μm or more, 5 μm or more, 7 μm or more, or 10 μm or more, and 50 μm or less, 40 μm or less, or 35 μm or less. When the expandable microspher has the average particle diameter as described above, it can be determined as suitable for achieving appropriate porosity.

At this time, the average particle diameter (D50) of the expandable microsphere may be measured by dispersing the powder to be measured in dispersion medium, introducing the powder into a commercially available laser diffraction particle size analyzer (e.g., Mastersizer 3000), and then measuring a difference of diffraction pattern according to the particle size when the particles pass through the laser beam, followed by calculating a particle size distribution.

When the expandable microsphere is foamed in air and its expansion ratio and size are confirmed, it can be confirmed whether the expandable microsphere can form pores with an appropriate size in the super absorbent polymer film.

The super absorbent polymer film prepared according to the present disclosure has a thickness of 0.8 mm or less, preferably 0.001 to 0.8 mm, and the pore size is suitably about 10 to 500 μm. Accordingly, in order to form pores with an appropriate size in the super absorbent polymer film, it is necessary to understand expansion properties of expandable microsphere.

Specifically, the expandable microsphere is applied on a glass petri dish, which is then heated in air for 10 minutes to expand the expandable microsphere. In this regard, when the expandable microsphere exhibits a maximum expansion ratio of 3 times to 15 times, 2 times to 12 times, or 1 time to 7 times in air, it is suitable for preparing a super absorbent polymer film having pores with an appropriate size.

Further, when the expandable microsphere exhibits a maximum expansion size of 150 μm or less in air, pores with an appropriate size may be formed. Specifically, when the expandable microsphere exhibits a maximum expansion size of 10 to 500 μm, 50 to 300 μm, 70 to 150 μm, or 75 to 150 μm in air, it is suitable for preparing a super absorbent polymer film having pores with an appropriate size.

In the expandable microsphere, expansion may begin at 60 to 200° C., 70 to 170° C., or 80 to 165° C., and maximum expansion may be reached at 100 to 240° C., 120 to 200° C., or 130 to 190° C.

Examples of the expandable microsphere include Expancel DU series from Nouryon such as Expancel 461 DU 40, Expancel 461 DU 20, Expancel 031 DU 40, Expancel 053 DU 40, and Expancel 551 DU 40; and/or Microsphere F series from Matsunomo such as Microsphere F-AC170D, Microsphere F-36, Microsphere F-36LV, Microsphere F-48, Microsphere F-80GS, and Microsphere F-50. Preferably, Expancel 031 DU 40 having a core containing hydrocarbon and a shell containing a copolymer of acrylate and acrylonitrile and/or Microsphere F-AC170D having a core containing hydrocarbon and a shell containing an acrylate copolymer can be used, but the present disclosure is not limited thereto.

The expanded microsphere is a foaming agent in an expanded state before use, and may be one in which an inorganic material such as talc and/or calcium carbonate is coated on the surface of hollow thermoplastic resin particles.

The thermoplastic resin may be a polymer formed from at least one monomer selected from the group consisting of (meth)acrylate, (meth)acrylonitrile, aromatic vinyl, vinyl acetate, vinyl halide, and vinylidene halide.

Preferably, the expanded microsphere may be one in which calcium carbonate is coated on the surface of hollow particles of (meth)acrylate and/or (meth)acrylonitrile copolymer.

The hollow thermoplastic resin particles of the expanded microsphere no longer expand, but shrink upon heating. However, the inorganic material on the surface exhibits foamability. Accordingly, pores having a size similar to that of the expanded microsphere can be formed, and thus the size of pores formed in the super absorbent polymer film can be adjusted by appropriately selecting the particle size of the expanded microsphere.

Thus, when the expanded microsphere has an average particle diameter (D50) of 10 μm or more, 20 μm or more, or 30 μm or more, and 150 μm or less, 130 μm or less, or 120 μm or less, it is suitable for preparing a super absorbent polymer film having pores with an appropriate size. Herein, the average particle diameter may be measured using the same method as in the expandable microsphere.

Meanwhile, the foaming temperature of the expanded microsphere may be 130° C. or more, 140° C. or more, or 150° C. or more, and 200° C. or less, or 180° C. or more.

Examples of the expanded microsphere include Microsphere MFL series from Matsunomo such as MFL-110CAL, MFL-100MCA, MFA HD60CA, MFL HD30CA, and MFL-SEVEN. Preferably, MFL-110CAL in which calcium carbonate powder is coated on the surface of hollow particles of a copolymer of acrylate and acrylonitrile may be used, but the present disclosure is not limited thereto.

As the azo-based compound, an azoamidine-based compound such as 2,2'-azobis(2-methylpropionamidine)dihydrochloride and 2,2-azobis[N-(2-carboxyethyl)-2-methylpropionamidine]tetrahydrate may be used, and preferably, 2,2'-azobis(2-methylpropionamidine)dihydrochloride may be used.

As the inorganic foaming agent, at least one selected from the group consisting of calcium carbonate ($CaCO_3$), sodium bicarbonate ($NaHCO_3$), ammonium bicarbonate ($NH_4HCO_3$), ammonium carbonate ($(NH_4)_2CO_3$), ammonium nitrite ($NH_4NO_2$), sodium borohydride ($NaBH_4$), and sodium carbonate ($Na_2CO_3$) may be used, and, preferably, calcium carbonate may be used.

As the inorganic foaming agent, micro- or nano-sized particles having a particle diameter of 1 nm to 100 μm may be used, and an appropriate type may be selected according to desired physical properties of the super absorbent polymer sheet. Herein, the particle size of the inorganic foaming agent may be measured by the above-described laser diffraction method, or may be measured by a scanning electron microscope (SEM).

In the present disclosure, the expandable microsphere, expanded microsphere, azo-based compound, and inorganic foaming agent may each be used as the foaming agent, or at least one foaming agent may be used in combination therewith.

Meanwhile, when at least one of the expandable microsphere and the expanded microsphere is used as a first foaming agent and at least one of the azo-based compound and the inorganic foaming agent is used as a second foaming agent, a weight ratio of the first foaming agent and the second foaming agent may be 1:0.3 to 1:3, or 1:0.5 to 1:2. When satisfying the weight ratio, an improved initial absorption rate may be exhibited as described above.

Meanwhile, the foaming agent may be contained in an amount of 0.1 to 10 parts by weight, more preferably 0.5 to 7 parts by weight, or 1 to 5 parts by weight based on 100 parts by weight of the monomer composition.

If the foaming agent is contained in an amount of less than 0.1 parts by weight based on 100 parts by weight of the monomer composition, a porous structure of the super absorbent polymer film by foaming cannot be secured, and thus the effect of improving the initial absorption rate cannot be obtained.

In addition, when the foaming agent is contained in excess of 10 parts by weight based on 100 parts by weight of the monomer composition, there may be a problem in that the degree of cross-linking of the polymer is lowered due to the foaming agent during polymerization. In addition, since the expandable microsphere foaming agent and the expanded microsphere foaming agent have low solubility in a solvent (e.g., water) and low density, if the content exceeds 10 parts by weight based on 100 parts by weight of the monomer composition, a phenomenon in which the foaming agent is precipitated from the monomer composition may occur, and thus foaming may not be performed well.

Most of the above foaming agents are actively foamed at 80° C. or more, or 100° C. or more. Accordingly, the foaming of the foaming agent may mainly occur in the drying step of the hydrogel polymer film.

The raw materials such as the acrylic acid-based unsaturated monomer, the cellulose-based thickener, the moisturizing agent, the internal cross-linking agent, the polymerization initiator, and the optionally-containing additive may be prepared in the form of a monomer composition solution dissolved in a solvent.

Any solvent which can dissolve the components may be used without limitation, and for example, one or more solvents selected from water, ethanol, ethyleneglycol, diethyleneglycol, triethyleneglycol, 1,4-butanediol, propyleneglycol, ethyleneglycol monobutylether, propyleneglycol monomethylether, propyleneglycol monomethylether acetate, methylethylketone, acetone, methylamylketone, cyclohexanone, cyclopentanone, diethyleneglycol monomethylether, diethyleneglycol ethylether, toluene, xylene, butyrolactone, carbitol, methylcellosolve acetate, N,N-dimethylacetamide, and the like may be used alone or in combination. For example, water may be used as the solvent.

In the present disclosure, the monomer composition exhibits a viscosity suitable for a solution casting method by containing a cellulose-based thickener and a moisturizing agent. Specifically, the viscosity at 25° C. of the monomer composition may be 100 mPa·s or more, 150 mPa·s or more, 200 mPa·s or more, or 300 mPa·s or more, and 12,000 mPa·s or less, 5,000 mPa·s or less, 3,000 mPa·s or less, 2,000 mPa·s or less, or 1,600 mPa·s or less. The viscosity of the monomer composition may be measured with a viscometer (e.g., TV-22 manufactured by TOKI) under the conditions of spindle #1 and a rotational speed of 1 rpm.

If the viscosity of the monomer composition is less than 100 mPa·s, it may be difficult to cast the monomer composition to a uniform thickness, and polymerize it while drawing it. Conversely, if the viscosity of the monomer composition exceeds 12,000 mPa·s, it is difficult to prepare a uniform monomer composition, and flowability of the monomer composition is low, so that processability is deteriorated and defoaming is difficult.

The monomer composition is prepared, and then casted on a substrate to prepare a monomer composition film. Then, it is polymerized while drawing it to form a hydrogel polymer film. Casting and polymerization of the monomer composition may be continuously performed through a roll-to-roll process. In particular, when the modified siloxane-based surfactant is contained in the monomer composition, the application of the monomer composition may be smoother, and thus, it may be more suitable for a high-speed continuous process.

The material of the substrate is not particularly limited, but it is preferable to use a material in which the monomer composition is easily applied and the hydrogel polymer film is easily separated after polymerization.

Specifically, a polyethylene terephthalate (PET) film in which at least one surface is hydrophobically treated with silicone or fluorine, which is usually used as a release film, may be used as the substrate. For example, the substrate may be a PET film surface-treated with a siloxane-based polymer or polytetrafluoroethylene (Teflon®). However, the material of the substrate is not limited thereto, and a suitable substrate may be selected depending on the composition and properties of the monomer composition.

For example, the PET film in which its surface is hydrophobically treated may have a water contact angle of 105° to 110°, and a surface energy of 20 to 25 mN/m. Such hydrophobic-treated PET film not only facilitates application of the monomer composition film, but also facilitates peeling of the hydrogel polymer film to be prepared after polymerization, thereby improving the convenience of the manufacturing process. In particular, when the above-described polyether-modified siloxane-based surfactant is contained in the monomer composition, an affinity with the hydrophobic-treated PET film having the above contact angle and surface energy is high, so that casting with a uniform thickness is possible. Thus, a uniform and thin film can be formed even in a roll-to-roll continuous process, thereby further improving productivity.

Meanwhile, unlike the general polymer solution casting method in which the solvent is removed after casting the polymer solution, the present disclosure immediately performs the drawing and polymerization process after the monomer composition is applied on the substrate so as not to decrease the moisture content.

If the moisture content of the monomer composition film is too low, components constituting the monomer composition may be precipitated before polymerization, and there may be a problem in that the film is broken after polymerization. Accordingly, the moisture content of the monomer composition film preferably satisfies the range of 30 wt % to 60 wt %, 30 wt % to 50 wt %, or 30 wt % to 45 wt %.

The thickness of the monomer composition film may be appropriately adjusted depending on the thickness of the desired super absorbent polymer film. Although the thickness of the monomer composition film hardly changes during the polymerization step, the thickness may decrease by about 10 to 40% or 15 to 35% while the moisture content decreases during the drying process of the hydrogel polymer film after polymerization. In consideration of this, a monomer composition film may be prepared with an appropriate thickness.

For an example, the thickness of the monomer composition film may be 0.8 mm or less, 0.6 mm or less, or 0.5 mm or less, and 0.001 mm or more, or 0.01 mm or more, but is not limited thereto. It can be appropriately adjusted depending on the composition of the monomer composition, specific conditions in the polymerization and drying steps, and the thickness of the desired super absorbent polymer film.

Subsequently, a polymerization reaction is performed by irradiating heat and/or light while drawing the monomer composition film in the longitudinal direction (MD direction) to form a hydrogel polymer film. Drawing the film during polymerization as described above can control flexibility of the hydrogel polymer film to be prepared and mechanical properties such as strength.

At this time, the tension applied to the monomer composition film may be 40 N/m or more, 45 N/m or more, 50 N/m or more, or 60 N/m or more, and 100 N/m or less, 90 N/m or less, or 80 N/m or less. If the film is drawn by applying an excessively large tension, the monomer composition film may be broken or the thickness may be excessively thin, and if the tension is too small, flexibility of the film and mechanical properties such as strength may not be achieved.

The polymerization temperature may be appropriately adjusted depending on the composition of the monomer composition, but is preferably 40° C. or more, or 50° C. or more for the smooth reaction. In addition, if the temperature is too high, the solvent evaporates and components constituting the monomer composition may be precipitated. Therefore, the polymerization temperature is preferably 90° C. or less or 80° C. or less.

The moisture content of the hydrogel polymer film prepared through the polymerization step may be about 20 wt % or more, preferably 25 wt % or more, and 40 wt % or less, or 35 wt % or less. Accordingly, the hydrogel polymer film is dried to prepare a final super absorbent polymer film.

The temperature of the drying step may be preferably 80 to 150° C., or 90 to 100° C. When the above-described foaming agent is contained in the monomer composition, the foaming agent may be actively foamed within the above drying temperature range.

In addition, drying for about 5 to 30 minutes within the above temperature range may provide a super absorbent polymer film having the moisture content of 15 wt % or less, 12 wt % or less, 10 wt % or less, or 9 wt % or less, and 1 wt % or more, 2 wt % or more, 4 wt % or more, or 6 wt % or more.

Meanwhile, in order to further improve physical properties of the super absorbent polymer film, surface modification of additionally cross-linking the surface of the super absorbent polymer film may be optionally performed. Through such surface modification, a surface modified layer (surface cross-linked layer) is formed on the surface of the super absorbent polymer film.

The surface modified layer may be formed by including the steps of: applying a surface cross-linking solution containing a surface cross-linking agent to the super absorbent polymer film; and heating the super absorbent polymer film coated with the surface cross-linking solution to perform surface modification.

Since the surface cross-linking agent is applied on the surface of the super absorbent polymer film, the surface cross-linking reaction occurs on the surface of the super absorbent polymer film and improves cross-linking properties on the surface without substantially affecting the inside of the film. Therefore, the surface-crosslinked super absorbent polymer film has a higher degree of cross-linking at the surface than inside.

The surface cross-linking agent is a compound capable of reacting with functional groups of the polymer in which an acrylic acid-based polymer is polymerized. For example, a polyhydric alcohol compound, an epoxy compound, a polyamine compound, a haloepoxy compound, a condensate of a haloepoxy compound, an oxazoline compound, a polyvalent metal salt, or an alkylene carbonate compound may be used.

In one embodiment, a polyhydric alcohol compound, an epoxy compound, or a combination thereof may be used as the surface cross-linking agent.

The polyhydric alcohol compound may be, for example, at least one selected from the group consisting of ethylene glycol, propylene glycol (1,2-propanediol), 1,3-propanediol, 1,4-butanediol, 1,6-hexanediol, 1,2-hexanediol, 1,3-hexanediol, 2-methyl-1,3-propanediol, 2,5-hexanediol, 2-methyl-1, 3-pentanediol, 2-methyl-2,4-pentanediol, tripropylene glycol and glycerol.

The epoxy compound may be, for example, at least one selected from the group consisting of ethylene glycol diglycidyl ether, propylene glycol diglycidyl ether, butanediol diglycidyl ether, hexanediol diglycidyl ether, diethylene glycol diglycidyl ether, triethylene glycol diglycidyl ether, polyethylene glycol diglycidyl ether, dipropylene glycol diglycidyl ether, tripropylene glycol diglycidyl ether, polypropylene glycol diglycidyl ether and glycerol triglycidyl ether.

Preferably, the surface cross-linking agent may use at least one polyhydric alcohol compound selected from ethylene glycol and propylene glycol; and at least one epoxy compound selected from ethylene glycol diglycidyl ether, propylene glycol diglycidyl ether, and diethylene glycol diglycidyl ether.

Meanwhile, the surface cross-linking solution may further contain polyacrylic acid (PAA-PEO comb polymer) having a polyethylene oxide side chain as an additive so that the surface cross-linking agent can be applied more smoothly. Accordingly, the surface cross-linking solution according to an embodiment of the present disclosure may contain propylene glycol and ethylene glycol diglycidyl ether as a surface cross-linking agent, and may further contain polyacrylic acid having a polyethylene oxide side chain as an additive.

Herein, the polyacrylic acid additive having a polyethylene oxide side chain is contained in an amount of 0.01 wt % or more, or 0.05 wt % or more, and 1.0 wt % or less, 0.7 wt % or less, or 0.5 wt % or less based on 100 wt % of the surface cross-linking solution to obtain the above-described effect.

The surface cross-linking agent is dispersed in a solvent and applied to the super absorbent polymer film in the form of a surface cross-linking solution. In this case, water and/or methanol may be used as the solvent.

The surface cross-linking agent may be contained in an amount of 0.1 wt % or more, 0.15 wt % or more, or 0.18 wt % or more, and 1.5 wt % or less, 1.3 wt % or less, 1.0 wt % or less, or 0.8 wt % or less, based on 100 wt % of the surface cross-linking solution. When the content of the surface cross-linking agent in the surface cross-linking solution is within the above range, it is preferable to optimize a penetration depth of the surface cross-linking agent when applied to the super-absorbent polymer film.

Meanwhile, the amount of surface cross-linking agent applied to the surface of the super absorbent polymer film, that is, the amount of surface cross-linking agent applied per unit area of the super absorbent polymer film that is not surface cross-linked (amount of surface cross-linking agent treated) may preferably be 0.05 $g/m^2$ or more, 0.1 $g/m^2$ or more, or 0.15 $g/m^2$ or more, and 2.0 $g/m^2$ or less, 1.5 $g/m^2$ or less, or 1.0 $g/m^2$ or less.

When the amount of the surface cross-linking agent applied to the surface of the super absorbent polymer film is within the above range, the penetration depth and the degree of surface cross-linking of the surface cross-linking agent may be optimized, and absorption properties of the super-absorbent polymer film may be improved. That is, if the amount of the surface cross-linking agent applied is too large, the surface cross-linking may proceed excessively, thereby deteriorating flexibility of the super absorbent polymer film. Conversely, if the amount of the surface cross-linking agent applied is too small, the surface cross-linking may not be sufficiently performed, and thus the effect of improving absorbency under pressure of the super absorbent polymer film to be prepared cannot be obtained.

Herein, the amount of the surface cross-linking agent applied to the surface of the super absorbent polymer film may be calculated by multiplying the amount (g) of surface cross-linking solution absorbed per unit area ($m^2$) when the super absorbent polymer film is immersed in the surface cross-linking solution for 1 second by the total content (unit: wt %) of the surface cross-linking agent in the surface cross-linking solution.

Alternatively, the surface cross-linking agent may be used in an amount of 0.01 parts by weight or more, 0.1 parts by weight or more, or 0.5 parts by weight or more, and 3 parts by weight or less, 2.5 parts by weight or less, or 2 parts by weight or less based on 100 parts by weight of the super absorbent polymer film that is not surface cross-linked to achieve an appropriate degree of surface cross-linking as described above.

The surface cross-linking solution may further contain at least one inorganic material selected from the group consisting of silica, clay, alumina, silica-alumina composite, and titania in addition to the surface cross-linking agent. The inorganic material may be used in the form of powder or liquid, and in particular, alumina powder, silica-alumina powder, titania powder, or nano-silica solution may be used.

In addition, the inorganic material may be used in an amount of about 0.001 to about 2 parts by weight based on 100 parts by weight of the super absorbent polymer film that is not surface cross-linked.

In addition, a polyvalent metal salt, for example, an aluminum salt, more specifically, at least one selected from the group consisting of aluminum sulfate, potassium salt, ammonium salt, sodium salt and hydrochloride salt may be further contained instead of or together with the inorganic material. When such a polyvalent metal salt is additionally used, the surface cross-linking structure of the super absorbent polymer film can be further optimized. The polyvalent metal salt may be used in an amount of 0.01 to 4 parts by weight based on 100 parts by weight of the super absorbent polymer film that is not surface cross-linked.

A method of applying the surface cross-linking solution to the surface of the super absorbent polymer film is not particularly limited, and various methods such as dip coating, spray coating, and paint brushing may be used without limitation.

For example, the surface cross-linking solution can be applied by immersing the super absorbent polymer film in a water bath containing the surface cross-linking solution, and then taking it out through a roll-to-roll process. In this case, it can be performed in a continuous process from the step of forming the monomer composition film, and the roll moves at a constant speed and transports the super absorbent polymer film, so that the amount of surface cross-linking solution applied can be kept constant.

Subsequently, surface modification (surface cross-linking reaction) is performed by heating the super absorbent polymer film coated with the surface cross-linking solution.

The surface cross-linking reaction may be performed at a temperature of 80° C. or more, 90° C. or more, or 100° C. or more. The temperature of the surface cross-linking reaction is preferably maintained at 150° C. or less, more preferably 140° C. or less, or 130° C. or less. If the temperature of the surface cross-linking is too high, there may be a problem of overdrying of the super absorbent polymer film, so it is preferable to maintain the above range.

The super absorbent polymer film prepared according to the preparation method is thin, and exhibits excellent absorption properties and flexibility. Since the super absorbent polymer film of the present disclosure can be used as an absorbent by itself without compounding with an auxiliary substance such as pulp, it can be suitably used for slim and thin-film products, and can exhibit excellent absorption performance without deformation of products.

The super absorbent polymer film of the present disclosure has a thickness of 0.8 mm or less, and does not require an auxiliary substance, which can provide a thinner absorbent than existing powder-type super absorbent polymers. Preferably, the thickness of the super absorbent polymer film is 0.6 mm or less, 0.5 mm or less, 0.4 mm or less, 0.3 mm or less, 0.2 mm or less, or 0.1 mm or less, and 0.001 mm or more, 0.005 mm or more, 0.01 mm or more, or 0.05 mm or more.

The super absorbent polymer film prepared according to the present disclosure exhibits excellent absorption performance while being thin.

Specifically, the super absorbent polymer film may have free absorption in physiological saline of 16 g/g or more, 18 g/g or more, 30 g/g or more, or 36 g/g or more. The higher the free absorption can be evaluated as the better, and there is no theoretical upper limit, but may be, for example, 60 g/g or less, or 55 g/g or less.

The super absorbent polymer film has a centrifugal retention capacity (CRC) of 20 g/g or more, 22 g/g or more, 28 g/g or more, 30 g/g or more, or 31 g/g or more, when measured in accordance with EDANA WSP 241.2, indicating excellent absorption properties. The higher centrifugal retention capacity can be evaluated as the better, and there is no theoretical upper limit, but may be, for example, 50 g/g or less, or 48 g/g or less.

The super absorbent polymer film may have extractable contents of 33 wt % or less, 31 wt % or less, 28 wt % or less, 27 wt % or less, 25 wt % or less, or 15 wt % or less, and 1 wt % or more, or 3 wt % or more, when measured in accordance with EDANA WSP 270.2.

Meanwhile, when the super absorbent polymer film is prepared by containing a foaming agent in the monomer composition, the super absorbent polymer film to be prepared has a porous structure having a plurality of pores with a diameter of about 10 to 500 μm. Accordingly, the super absorbent polymer film may have an excellent initial absorption rate of 200 seconds or less, 150 seconds or less, or 130 seconds or less. The initial absorption rate can be obtained by cutting the super absorbent polymer film to a size of 10 cm*25 cm, and then measuring the time taken for the film to absorb 80 ml of a NaCl (0.9%) solution. The initial absorption rate of the super absorbent polymer film may be, for example, 5 seconds or more, or 10 seconds or more.

In addition, when the surface modification is further performed, the absorbency under pressure of the super absorbent polymer film may be further improved. For example, the surface-modified super absorbent polymer film may have the absorbency under pressure (AUP) at 0.7 psi of 10 g/g or more, 11 g/g or more, or 12 g/g or more, and 25 g/g or less, or 20 g/g or less, when measured in accordance with EDANA WSP 242.2.

A method for measuring the free absorption in physiological saline, centrifugal retention capacity, extractable contents, initial absorption rate, and absorbency under pressure of the super absorbent polymer film may be specified in Examples to be described later.

As such, the super absorbent polymer film of the present disclosure is excellent not only in absorption performance but also in flexibility and elasticity, and thus can be used for various purposes such as waterproofing and reinforcing materials for diapers, wires and cables, electrolyte absorbers, flame retardants, wound protection agents, fresh-keeping agents for food, water retaining soil products, etc.

The shape of the super absorbent polymer film is not particularly limited as long as the thickness thereof satisfies 0.8 mm or less. For example, the super absorbent polymer film may be in the form of a flat film having a constant thickness without irregularities on the surface, or may have a pattern formed on the surface to improve flowability of the liquid. In this case, the shape of the pattern is not particularly limited, and the pattern may be formed by variously adjusting the length, width, depth, etc. of the recess and convex portions, if necessary.

Hereinafter, the present invention will be described in more detail with the following preferred examples, but these examples are provided for illustrative purposes only. It is apparent to those skilled in the art that various changes and modifications can be made within the scope and spirit of the present invention. Therefore, it is obvious that the changes and modifications are within the scope of the present invention.

EXAMPLES

Hereinafter, physical properties of the super absorbent polymer films (or sheets) of Examples and Comparative Examples were measured by the following method.

(1) Moisture Content

The moisture content was calculated with the weight before drying (a) and the weight after drying (b) of the super absorbent polymer film (or sheet) specimen. At this time, the specimen was dried in such a way that the temperature was increased from room temperature (25° C.) to 150° C. over 5 minutes, and then maintained at 150° C. for 15 minutes.

$$\text{Moisture content (\%)} = (a-b)/a*100$$

(2) Thickness of Super Absorbent Polymer Film (or Sheet)

The thickness was measured at three different arbitrary positions in the super absorbent polymer film (or sheet) using a film thickness meter from Mitutoyo, and the average value thereof was calculated.

(3) Free Absorption (g/g)

The super absorbent polymer film was cut to have a weight of 0.04 g, and immersed in 50 g of a 0.9 wt % sodium chloride aqueous solution (physiological saline) at 25° C. for 10 minutes. Then, the super absorbent polymer film was taken out, and unabsorbed moisture was removed using a sieve. Then, the free absorption per g of the super absorbent polymer film was calculated by comparing the weight of the initial super absorbent polymer film (0.04 g) with the weight of the swollen super absorbent polymer film after immersion for 10 minutes.

$$\text{Free absorption (g/g)} = (M_1 - M_0)/M_0$$

$M_1$: Weight of super absorbent polymer film after immersion in physiological saline for 10 minutes $M_0$: Weight of initial super absorbent polymer film (4) Centrifugal Retention Capacity (CRC, g/g)

The centrifugal retention capacity (CRC) was measured in accordance with EDANA WSP 241.2. The moisture content of the super absorbent polymer film of each Example and Comparative Example to be measured is as shown in Tables below, and the centrifugal retention capacity was measured without adjusting the moisture content.

Specifically, the super absorbent polymer film was cut to have a weight (W0) of 0.08 to 0.12 g, put in a non-woven envelope, and sealed. Then, it was immersed in 0.9 wt % sodium chloride aqueous solution (physiological saline) at room temperature. After 30 minutes, the envelope was centrifuged at 250 G for 3 minutes to drain, and the weight W2 (g) of the envelope was measured. Further, after carrying out the same operation without using the polymer, weight W1 (g) of the envelope was measured. Then, CRC (g/g) was calculated by using the obtained weight values according to the following equation.

$$\text{CRC (g/g)} = \{[W2(g) - W1(g)]/W0(g)\} - 1$$

(5) Extractable Contents (EC, Wt %)

The extractable contents (EC) was measured in accordance with EDANA WSP 270.2.

Specifically, the super absorbent polymer film was cut to have a weight of 1.0 g, added to 200 g of a 0.9 wt % NaCl solution, and then kept to be soaked for 16 hours while stirring at 500 rpm. Then, the aqueous solution was filtrated by a filter paper. The filtrated solution was first titrated with a 0.1 N caustic soda solution to a pH of 10.0, and then reverse-titrated with a 0.1 N hydrogen chloride solution to a pH of 2.7. At this time, a polymer material that was not cross-linked was calculated from the amount required for the neutralization, and measured as the extractable contents.

(6) Absorbency Under Pressure (AUP, g/g)

The absorbency under pressure at 0.7 psi was measured in accordance with EDANA WSP 242.2. The moisture content of the super absorbent polymer film of each Example and Comparative Example to be measured is as shown in Tables below, and the absorbency under pressure was measured without adjusting the moisture content.

Specifically, a 400 mesh stainless steel screen was installed in a cylindrical bottom of a plastic having an inner diameter of 25 mm. The super absorbent polymer film was cut to have a weight (W3) of about 0.6 g and added on the screen at room temperature and a humidity of 50%. Thereafter, a piston which can uniformly provide a load of 0.7 psi was placed thereon. Herein, the outer diameter of the piston was slightly smaller than 25 mm, there was no gap with the inner wall of the cylinder, and jig-jog of the cylinder was not interrupted. At this time, the weight W4 (g) of the device was measured.

Subsequently, a glass filter having a diameter of 90 mm and a thickness of 5 mm was placed in a petri dish having a diameter of 150 mm, and saline (0.9 wt % sodium chloride) was poured in the dish. At this time, the saline was poured until the surface level of the saline became equal to the upper surface of the glass filter. One sheet of filter paper with a diameter of 90 mm was placed thereon. After the measuring device was placed on the filter paper, the liquid was absorbed for 1 hour under a load. After 1 hour, the measuring device was lifted, and the weight W5 (g) was measured.

Then, the absorbency under pressure (g/g) was calculated by using the obtained weight values according to the following equation.

$$\text{AUP (g/g)} = [W5(g) - W4(g)]/W3(g)$$

(7) Initial Absorption Rate

The super absorbent polymer film was cut to have a size of 10 cm*25 cm, and the time taken for the film to absorb 80 ml of a NaCl (0.9%) solution was measured. The moisture content of the super absorbent polymer film of each Example and Comparative Example to be measured is as shown in Tables below, and the initial absorption rate was measured without adjusting the moisture content.

(8) Bending Test (Flexibility)

The flexibility of each super absorbent polymer film was confirmed according to ASTM D522 using a cylindrical mandrel bend tester (KP M5500). In the test, a mandrel having a diameter of 4 mm (4R) was used. When it was broken or cracked, it was evaluated as X, and when its shape was maintained, it was evaluated as O.

(9) Total Light Transmittance (%), Yellow Index, and Haze

The total light transmittance with respect to visible light, the yellow index according to ASTM D1925, and the haze were measured using COH-400 (manufactured by NIPPON DENSHOCU).

(10) BPI (Base Polymer Index)

With the centrifugal retention capacity (CRC) and extractable contents (EC) measured according to the above measurement method, BPI was calculated according to the following equation.

$$\text{BPI} = (\text{CRC} + 8.762)/\ln(\text{EC})$$

(11) Expansion Anisotropy

A super absorbent polymer film having an initial thickness of h was cut into a square shape having the same horizontal and vertical widths of d, and immersed in 0.9 wt % sodium chloride aqueous solution at 25° C. for 60 minutes to free-swell. Thereafter, the swollen super absorbent polymer film was removed from the sodium chloride aqueous solution, and the moisture not absorbed in the super absorbent polymer film was removed using a sieve. After measuring the width d' (average of horizontal and vertical widths) and thickness h' of the swollen super absorbent polymer film, the expansion anisotropy was calculated by dividing the expansion ratio in the thickness direction (h'/h) by the expansion ratio in the plane direction (d'/d).

$$\text{Expansion anisotropy} = \frac{(h'/h)}{(d'/d)}$$

The thicknesses (h, h') and horizontal and vertical widths (d, d') are average values derived from measurements at three or more different positions in the same super absorbent polymer film using a microscope and a precision ruler.

Example 1

A neutralized solution in which 70 mol % of acrylic acid was neutralized was prepared by mixing 55 g of acrylic acid, 66.6 g of a 45 wt % potassium hydroxide (KOH) solution, and 55 g of water.

Hydroxyethyl cellulose (HEC, Natrosol 250HR manufactured by Ashland) as a thickener, glycerin as a moisturizing agent, sodium persulfate as a thermal polymerization initiator, and Irgacure 819 as a photopolymerization initiator were added to the neutralized solution to prepare a monomer composition having a solid content (TSC) of 54 wt %.

At this time, HEC was added in an amount of 0.45 parts by weight based on 100 parts by weight of the solid content in the monomer composition, and glycerin was added in an amount of 40 parts by weight based on 100 parts by weight of acrylic acid. In addition, the thermal polymerization initiator and the photopolymerization initiator were added in an amount of 1000 ppm and 80 ppm based on the total weight of the monomer composition, respectively.

A viscosity of the prepared monomer composition at 25° C. was measured using TOKI viscometer (TV-22) under the conditions of 1 rpm and spindle #1 (hereinafter, the viscosity of the monomer composition was measured in the same manner). As a result, the viscosity of the monomer composition was confirmed to be 201 mPa·s.

Subsequently, the monomer composition was coated on one surface of a polyethylene terephthalate (PET) release film (Mitsubishi MRL film) whose surface was hydrophobically treated with a siloxane-based polymer to form a 0.1 mm thick monomer composition film (moisture content of 30%). A comma coater (Gap 365 μm) was used for coating, and an applicator roll moved at 0.5 m/min.

Then, polymerization was performed by irradiating UV light of 370 mJ/cm² to the monomer composition film to form a hydrogel polymer film. Herein, a polymerization reaction was performed while drawing the monomer composition film with tension of 60 N/m in the MD direction. The thickness of the prepared hydrogel polymer film was 0.1 mm, and it was confirmed that there was no significant change compared to the monomer composition and the moisture content was 30 wt %.

Subsequently, the prepared hydrogel polymer was dried at a temperature of 90° C. for 10 minutes to prepare a super absorbent polymer film (SAP film) having a moisture content of 9.14 wt % and a thickness of 0.087 mm.

Examples 2 to 7

Super absorbent polymer films of Examples 2 to 7 were prepared in the same manner as in Example 1, except that the monomer composition further contains polyethylene glycol diacrylate (PEGDA, MW=400, manufacturer: Aldrich) as an internal cross-linking agent, and the composition of the monomer composition and the thickness of the hydrogel polymer film were changed as shown in Table 1 below.

Example 8

A monomer composition was prepared in the same manner as in Example 1, except that sodium carboxymethyl cellulose (CMC, average weight average molecular weight: 250,000, degree of substitution: 0.7) was used in an amount of 0.68 parts by weight based on 100 parts by weight of the solid content in the monomer composition instead of HEC as a thickener, and 2000 ppm (based on the total weight of the monomer composition) of PEGDA was further contained as an internal cross-linking agent.

The monomer composition was coated on one surface of a polyethylene terephthalate (PET) release film whose surface was hydrophobically treated with a siloxane-based polymer to a thickness of 0.2 mm to form a monomer composition film. Then, the monomer composition film was polymerized by irradiating UV light of 370 mJ/cm² to form a hydrogel polymer film. Herein, a polymerization reaction was performed while drawing the monomer composition film with tension of 60 N/m in the MD direction.

Subsequently, the prepared hydrogel polymer film was dried at a temperature of 110° C. for 15 minutes to prepare a super absorbent polymer film.

Example 9

A monomer composition was prepared in the same manner as in Example 1, except that propylene glycol was used instead of glycerin as a moisturizing agent, and 2000 ppm of PEGDA (based on the total weight of the monomer composition) was further contained as an internal cross-linking agent.

The monomer composition was coated on one surface of a polyethylene terephthalate (PET) release film whose surface was hydrophobically treated with a siloxane-based polymer to a thickness of 0.2 mm to form a monomer composition film. Then, the monomer composition film was polymerized by irradiating UV light of 370 mJ/cm² to form a hydrogel polymer film. Herein, a polymerization reaction was performed while drawing the monomer composition film with tension of 60 N/m in the MD direction.

Subsequently, the prepared hydrogel polymer was dried at a temperature of 110° C. for 15 minutes to prepare a super absorbent polymer film.

Example 10

A super absorbent polymer film was prepared in the same manner as in Example 3, except that the drawing tension applied to the monomer composition film during polymerization was 80 N/m.

Comparative Example 1

A monomer composition was prepared in the same manner as in Example 4, except that HEC was not included. However, since the viscosity was low, casting to a thickness of 0.5 mm or less was impossible, and thus a monomer composition film could not be formed.

Comparative Example 2

A super absorbent polymer film of Comparative Example 2 was prepared in the same manner as in Example 4, except that glycerin was not included during the preparation of the monomer composition.

Comparative Example 3

A super absorbent polymer film was prepared in the same manner as in Example 3, except that the monomer composition film was not drawn during polymerization.

Comparative Example 4

Referring to Example 14 of Japanese Patent Application Laid-Open No. Hei 09-183856, a sheet-type super absorbent polymer was prepared by the following method.

ring at 60° C. for 2 hours to proceed with polymerization to obtain a gel polymer.

After drying the obtained polymer at 160° C., 2 g of glycerin was added to 8 g of the dried polymer particles, and water was sprayed such that the moisture content was 20%. The polymer particles to which glycerin and water were added were uniformly spread on a 10 cm*10 cm plate, and left in a constant temperature and humidity room (25° C., RH 90%) for 10 minutes. Subsequently, a sheet-type super absorbent polymer having a thickness of 1.042 mm was prepared by rolling for 5 minutes at a temperature of 150° C. and a pressure of 350 gf/cm$^2$.

The compositions of the monomer compositions of Examples 1 to 10 and Comparative Examples 1 to 4, and the thicknesses of the monomer composition films are summarized in Table 1 below.

TABLE 1

| | Monomer composition | | | | | | | | |
| --- | --- | --- | --- | --- | --- | --- | --- | --- | --- |
| | Viscosity (mPa · s)[1] | TSC (%) | Degree of neutral- ization of monomer (%) | Internal cross- linking agent (ppm) [2] | Thickner (parts by weight)[3] | Moisturizing agent (parts by weight)[4] | Photo- initiator (ppm) [2] | Thermal initiator (ppm) [2] | Thickness of monomer composition film (mm) |
| Ex. 1 | 201 | 54 | 70 | 0 | 0.45 | 40 | 80 | 1000 | 0.1 |
| Ex. 2 | 201 | 54 | 70 | 500 | 0.45 | 40 | 80 | 1000 | 0.1 |
| Ex. 3 | 201 | 54 | 70 | 1000 | 0.45 | 40 | 80 | 1000 | 0.1 |
| Ex. 4 | 201 | 54 | 70 | 2000 | 0.45 | 40 | 80 | 1000 | 0.1 |
| Ex. 5 | 1189 | 54 | 70 | 500 | 0.75 | 40 | 80 | 1000 | 0.1 |
| Ex. 6 | 1189 | 54 | 70 | 500 | 0.75 | 40 | 80 | 1000 | 0.3 |
| Ex. 7 | 1189 | 54 | 70 | 500 | 0.75 | 40 | 80 | 1000 | 0.4 |
| Ex. 8 | 332 | 54 | 70 | 2000 | 0.68 | 40 | 80 | 1000 | 0.2 |
| Ex. 9 | 562 | 54 | 70 | 2000 | 0.45 | 40 | 80 | 1000 | 0.2 |
| Ex. 10 | 215 | 54 | 70 | 1000 | 0.45 | 40 | 80 | 1000 | 0.1 |
| Comp Ex. 1 | 25 | 53 | 70 | 2000 | 0 | 40 | 80 | 1000 | n/a |
| Comp Ex. 2 | 245 | 48 | 70 | 2000 | 0.45 | 0 | 80 | 1000 | 0.1 |
| Comp Ex. 3 | 215 | 54 | 70 | 1000 | 0.45 | 40 | 80 | 1000 | 0.1 |
| Comp Ex. 4 | n/a | 40 | 75 | 200 | 0.17 | — | 0 | 2000 | n/a |

[1]TOKI Viscometer(TV-22), 1 rpm, Rotor # 1
[2] Content in total weight of monomer composition
[3]Content in 100 parts by weight of solid content in monomer composition
[4]Content based on 100 parts by weight of acrylic acid In a 1 L beaker, 400 ml of cyclohexane and 1.6 g of sucrose fatty acid ester surfactant with an HLB value of 6 were added and stirred to prepare a reaction solvent for reverse-phase suspension polymerization.

In 110.7 g of a monomer aqueous solution having a solid content of 35% of acrylic acid and sodium acrylate (degree of neutralization: 75%) as monomer components, 5.85 mg of N,N-methylenebisacrylamide as an internal cross-linking agent and 193.6 mg of hydroxyethyl cellulose (HEC) as a thickener were dissolved to prepare a monomer aqueous solution. Then, 58.5 mg of potassium persulfate, a polymerization initiator, was added and dissolved while bubbling nitrogen gas in the monomer aqueous solution.

A monomer aqueous solution in which a polymerization initiator was dissolved was added to the prepared reverse-phase suspension polymerization solvent, followed by stir- The following Table 2 shows the results of measuring the moisture content, free absorption, CRC, EC, flexibility, total light transmittance, and yellow index of the super absorbent polymer films (or sheets) of Examples 1 to 10 and Comparative Example 2 to 4.

Referring to Table 2 below, it was confirmed that the super absorbent polymer films of Examples 1 to 10 prepared according to the present disclosure were thin and had excellent absorption properties. In addition, the super absorbent polymer films prepared in Examples 1 to 10 were elastic and transparent films with excellent flexibility, and there was no crack or breakage even when the films were bent by 180 degrees.

However, the super absorbent polymer film of Comparative Example 2 in which glycerin was not added had a lack of flexibility and was broken in the bending test, and exhibited lower absorption performance and higher extractable contents compared to Example 4 having a similar composition. In addition, it was confirmed that Comparative Example 3, which was not drawn during polymerization, had significantly lower free absorption and CRC compared to Example 3 prepared using the same monomer composition with the same thickness. In addition, Comparative Example 4 prepared in the form of a sheet by rolling a particulate-type polymer was in the form of an opaque yellow sheet, which is a shape different from that of Examples. In addition, it was confirmed that Comparative Example 4 was significantly inferior in various absorption properties such as flexibility, free absorption, and CRC compared to Examples.

TABLE 2

| | Thickness of super absorbent polymer film after drying (mm) | Moisture content (%) | Free absorption (g/g) | CRC (g/g) | EC (%) | Flexibility | Total light transmittance (%) | Yellow Index |
|---|---|---|---|---|---|---|---|---|
| Ex. 1 | 0.087 | 9.14 | 53 | 46.3 | 31.6 | ◯ | 92.46 | 1.28 |
| Ex. 2 | 0.093 | 9.28 | 49.8 | 33 | 12.9 | ◯ | 92.11 | 1.08 |
| Ex. 3 | 0.090 | 9.64 | 42 | 28 | 9.9 | ◯ | 91.08 | 1.11 |
| Ex. 4 | 0.088 | 9.07 | 36 | 22.6 | 4.6 | ◯ | 91.85 | 1.13 |
| Ex. 5 | 0.092 | 9.19 | 48.8 | 37.7 | 13.8 | ◯ | 90.84 | 1.57 |
| Ex. 6 | 0.207 | 10.28 | 18.1 | 31.5 | 23.2 | ◯ | 90.3 | 2.14 |
| Ex. 7 | 0.288 | 10.89 | 16.2 | 30.2 | 33.1 | ◯ | 89.74 | 2.41 |
| Ex. 8 | 0.192 | 11.3 | 40.6 | 26.4 | 11 | ◯ | 91.9 | 0.49 |
| Ex. 9 | 0.194 | 11.7 | 37.4 | 23.1 | 26 | ◯ | 90.6 | 0.72 |
| Ex. 10 | 0.086 | 9.89 | 40 | 24.5 | 4 | ◯ | 92.32 | 1.01 |
| Comp Ex. 2 | 0.090 | 8.85 | 28 | 11.2 | 19 | X | 91.84 | 1.19 |
| Comp Ex. 3 | 0.094 | 9.29 | 34 | 20.8 | 8.9 | ◯ | 90.05 | 1.27 |
| Comp Ex. 4 | 1.083 | 10.5 | 12.4 | 5.1 | 6.1 | X | 0 | 45.2 |

Example 11

A neutralized solution (aqueous solution) in which 75 mol % of acrylic acid was neutralized was prepared by using sodium hydroxide (NaOH) instead of potassium hydroxide (KOH).

Hydroxyethyl cellulose (HEC, Natrosol 250HR manufactured by Ashland) as a thickener, glycerin as a moisturizing agent, polyethylene glycol diacrylate (PEGDA, MW=400, manufacturer: Aldrich) as an internal cross-linking agent, sodium persulfate as a thermal polymerization initiator, and Irgacure 819 as a photopolymerization initiator were added to the neutralized solution to prepare a monomer composition having a solid content (TSC) of 49 wt %.

At this time, HEC was added in an amount of 0.55 parts by weight based on 100 parts by weight of the solid content in the monomer composition, and glycerin was added in an amount of 40 parts by weight based on 100 parts by weight of acrylic acid. In addition, the PEGDA, the thermal polymerization initiator and the photopolymerization initiator were added in an amount of 1000 ppm, 1000 ppm and 80 ppm based on the total weight of the monomer composition, respectively.

The monomer composition was coated on one surface of a polyethylene terephthalate (PET) release film whose surface was hydrophobically treated with a siloxane-based polymer to a thickness of 0.2 mm to form a monomer composition film. Then, the monomer composition film was polymerized by irradiating UV light of 370 mJ/cm² to form a hydrogel polymer film. Herein, a polymerization reaction was performed while drawing the monomer composition film with tension of 60 N/m in the MD direction.

Subsequently, the prepared hydrogel polymer was dried at a temperature of 110° C. for 15 minutes to prepare a super absorbent polymer film.

Example 12

A super absorbent polymer film was prepared in the same manner as in Example 11, except that 80 parts by weight of glycerin was used based on 100 parts by weight of acrylic acid when preparing the monomer composition.

Example 13

A neutralized solution (aqueous solution) in which 75 mol % of acrylic acid was neutralized was prepared by mixing a neutralized solution of acrylic acid with a degree of neutralization of 75% neutralized with NaOH and a neutralized solution of acrylic acid with a degree of neutralization of 75% neutralized with KOH in a weight ratio of 2:1.

A super absorbent polymer film was prepared in the same manner as in Example 11 using the above neutralized solution of acrylic acid.

Example 14

A neutralized solution (aqueous solution) in which 75 mol % of acrylic acid was neutralized was prepared by mixing a neutralized solution of acrylic acid with a degree of neutralization of 75% neutralized with NaOH and a neutralized solution of acrylic acid with a degree of neutralization of 75% neutralized with KOH in a weight ratio of 1:1.

A super absorbent polymer film was prepared in the same manner as in Example 11 using the above neutralized solution of acrylic acid.

Example 15

A neutralized solution (aqueous solution) in which 75 mol % of acrylic acid was neutralized was prepared by mixing a neutralized solution of acrylic acid with a degree of neutralization of 75% neutralized with NaOH and a neutralized solution of acrylic acid with a degree of neutralization of 75% neutralized with KOH in a weight ratio of 1:2.

A super absorbent polymer film was prepared in the same manner as in Example 11 using the above neutralized solution of acrylic acid.

The compositions of the monomer compositions of Examples 11 to 15 and the thicknesses of the monomer composition films are summarized and shown in Table 3 below.

28 based on 100 parts by weight of the solid content in the monomer composition, respectively, and glycerin was added in an amount of 40 parts by weight based on 100 parts by weight of acrylic acid. In addition, the thermal polymerization initiator, the photopolymerization initiator and the internal cross-linking agent were added in an amount of 1000

TABLE 3

| | Monomer composition | | | | | | | | |
|---|---|---|---|---|---|---|---|---|---|
| | Viscosity (mPa · s)[1] | TSC (%) | Degree of neutral-ization of monomer (%) | Internal cross-linking agent (ppm) [2] | Thickner (parts by weight)[3] | Moisturizing agent (parts by weight)[4] | Photo-initiator (ppm) [2] | Thermal initiator (ppm) [2] | Thickness of monomer composition film (mm) |
| Ex. 11 | 1720 | 49 | 75.4 | 1000 | 0.55 | 40 | 80 | 1000 | 0.2 |
| Ex. 12 | 1140 | 49 | 75.6 | 1000 | 0.55 | 80 | 80 | 1000 | 0.2 |
| Ex. 13 | 2627 | 48 | 74.4 | 1000 | 0.55 | 40 | 80 | 1000 | 0.2 |
| Ex. 14 | 2585 | 49 | 73.5 | 1000 | 0.55 | 40 | 80 | 1000 | 0.2 |
| Ex. 15 | 1331 | 51 | 72.2 | 1000 | 0.55 | 40 | 80 | 1000 | 0.2 |

[1]TOKI Viscometer (TV-22), 1 rpm, Rotor # 1
[2] Content in total weight of monomer composition
[3]Content in 100 parts by weight of solid content in monomer composition
[4]Content based on 100 parts by weight of acrylic acid The following Table 4 shows the results of measuring the moisture content, flexibility, CRC, EC, BPI, total light transmittance, yellow index, and haze of the super absorbent polymer films of Examples 11 to 15. From the table below, it was confirmed that a super absorbent polymer film having excellent absorbency could be prepared not only using KOH, but also using NaOH when preparing a neutralized solution of acrylic acid.

ppm, 80 ppm, and 500 ppm based on the total weight of the monomer composition, respectively.

A viscosity of the prepared monomer composition at 25° C. was measured using TOKI viscometer (TV-22) under the conditions of spindle #1 and a rotation speed of 1 rpm. As a result, the viscosity of the monomer composition was confirmed to be 247 mPa·s.

TABLE 4

| | Ex. 11 | Ex. 12 | Ex. 13 | Ex. 14 | Ex. 15 |
|---|---|---|---|---|---|
| Alkali substance | NaOH | NaOH | NaOH:KOH = 2:1 | NaOH:KOH = 1:1 | NaOH:KOH = 1:2 |
| Moisture content (%) | 11.9 | 16.4 | 11.8 | 11.9 | 12.6 |
| Flexibility | ○ | ○ | ○ | ○ | ○ |
| CRC (g/g) | 44.9 | 42.1 | 46.2 | 30.2 | 36.3 |
| EC (%) | 21.7 | 31.8 | 22.6 | 22.6 | 17.2 |
| BPI | 17.4 | 14.7 | 17.6 | 12.5 | 15.8 |
| Total light transmittance (%) | 91.3 | 91.9 | 91.2 | 91.4 | 91.5 |
| Yellow index | 0.48 | 0.42 | 0.28 | 0.03 | 0.2 |
| Haze | 48.6 | 46.3 | 39 | 43.7 | 40.9 |

Example 16

A neutralized solution in which 70 mol % of acrylic acid was neutralized was prepared by mixing 55 g of acrylic acid, 66.6 g of a 45 wt % potassium hydroxide (KOH) solution, and 55 g of water.

BYK-348 as a polyether-modified siloxane surfactant, polyethylene glycol diacrylate (PEGDA, MW=400, manufacturer: Aldrich) as an internal cross-linking agent, hydroxyethyl cellulose (HEC, Natrosol 250HR manufactured by Ashland) as a thickener, glycerin as a moisturizing agent, sodium persulfate as a thermal polymerization initiator, and Irgacure 819 as a photopolymerization initiator were added to the neutralized solution to prepare a monomer composition having a solid content (TSC) of 54 wt %.

At this time, the surfactant and HEC were added in an amount of 0.2 parts by weight and 0.45 parts by weight The monomer composition was coated on one surface of a polyethylene terephthalate (PET) film (Mitsubishi MRL film, surface tension 20-25 mN/m, contact angle to water 105.93°) whose surface was hydrophobically treated with a siloxane-based polymer to form a 0.1 mm thick monomer composition film (moisture content of 30%). A comma coater (Gap 365 μm, width 35 cm, line speed 0.5 m/min) was used for coating.

The thickness deviation of the monomer composition film thus prepared was measured at 9 points in the TD direction, and as a result, '(maximum thickness−minimum thickness)/minimum thickness' was less than 20, confirming excellent coating properties.

Then, polymerization was performed by irradiating UV light of 370 mJ/cm$^2$ to the monomer composition film to form a hydrogel polymer film. Herein, a polymerization reaction was performed while drawing the monomer composition film with tension of 60 N/m in the MD direction. The temperature during polymerization was in the range of 30 to 80° C.

Subsequently, the prepared hydrogel polymer was dried at a temperature of 110° C. for 10 minutes to prepare a super absorbent polymer film.

Example 17

A super absorbent polymer film was prepared in the same manner as in Example 16, except that BYK-349, a polyether-modified siloxane surfactant, was used as the surfactant. As in Example 16, the monomer composition of Example 17 also had '(maximum thickness–minimum thickness)/minimum thickness' of less than 20, confirming excellent coating properties.

Example 18

A super absorbent polymer film was prepared in the same manner as in Example 16, except that BYK-3450, a polyether-modified siloxane surfactant, was used as the surfactant. As in Example 16, the monomer composition of Example 18 also had '(maximum thickness–minimum thickness)/minimum thickness' of less than 20, confirming excellent coating properties.

The following Table 5 shows the results of measuring the moisture content, CRC, EC, total light transmittance, and yellow index of the super absorbent polymer films of Examples 16 to 18. From the table below, it was confirmed that even when a surfactant was contained in the monomer composition, basic absorption properties such as centrifugal retention capacity were excellent and extractable contents was low.

Therefore, it was confirmed from the experimental results of Examples 16 to 18 that when a polyether-modified siloxane surfactant was contained, it was possible to prepare a super absorbent polymer film with excellent uniformity without affecting physical properties of the super absorbent polymer film and without thickness deviation.

TABLE 5

| | Moisture content (%) | CRC (g/g) | EC (%) | Total light transmittance (%) | Yellow index |
|---|---|---|---|---|---|
| Ex. 16 | 11.9 | 33.0 | 12.9 | 92.2 | 1.01 |
| Ex. 17 | 11.3 | 32.8 | 12.3 | 92.0 | 1.11 |
| Ex. 18 | 12.5 | 31.9 | 13.6 | 91.8 | 1.17 |

Example 19

A neutralized solution in which 70 mol % of acrylic acid was neutralized was prepared by mixing 55 g of acrylic acid, 66.6 g of a 45 wt % potassium hydroxide (KOH) solution, and 55 g of water.

An internal cross-linking agent (polyethylene glycol diacrylate (PEGDA), MW=400, manufacturer: Aldrich), expanded microsphere (MFL110CAL, manufactured by Matsumoto Yushi-Seiyaku, average particle diameter 90-120 μm, foaming temperature 160-170° C.) as a foaming agent, hydroxyethyl cellulose (HEC, Natrosol 250HR manufactured by Ashland) as a thickener, glycerin as a moisturizing agent, sodium persulfate as a thermal polymerization initiator, and Irgacure 819 as a photopolymerization initiator were added to the neutralized solution to prepare a monomer composition having a solid content (TSC) of 40 wt %.

At this time, the foaming agent was added in an amount of 1 parts by weight based on 100 parts by weight of the monomer composition, HEC was added in an amount of 0.85 parts by weight based on 100 parts by weight of the solid content in the monomer composition, and glycerin was added in an amount of 40 parts by weight based on 100 parts by weight of acrylic acid. In addition, the thermal polymerization initiator, the photopolymerization initiator and the internal cross-linking agent were added in an amount of 1000 ppm, 80 ppm and 2000 ppm based on the total weight of the monomer composition, respectively.

A viscosity of the prepared monomer composition at 25° C. was measured using TOKI viscometer (TV-22) under the conditions of spindle #1 and a rotation speed of 1 rpm. As a result, the viscosity of the monomer composition was confirmed to be 902 mPa·s.

Subsequently, the monomer composition was coated on one surface of a polyethylene terephthalate (PET) release film whose surface was hydrophobically treated with a siloxane-based polymer to form a 0.1 mm thick monomer composition film (moisture content of 30%). A comma coater (Gap 365 μm) was used for coating, and an applicator roll moved at 0.5 m/min.

Then, polymerization was performed by irradiating UV light of 370 mJ/cm$^2$ to the monomer composition film to form a hydrogel polymer film. Herein, a polymerization reaction was performed while drawing the monomer composition film with tension of 60 N/m in the MD direction. The temperature during polymerization was in the range of 30 to 80° C.

Subsequently, the prepared hydrogel polymer was dried at a temperature of 90° C. for 10 minutes to prepare a super absorbent polymer film (SAP film).s

Examples 20 to 27

Super absorbent polymer films were prepared in the same manner as in Example 19, except that the material shown in Table 6 was used instead of MFL110CAL as the foaming agent, and the composition of the monomer composition and the thickness of the hydrogel polymer film were changed as shown in Table 6 below.

The types of each foaming agent listed in Table 6 are as follows, and the content of each foaming agent (wt % based on 100 wt % of the monomer composition) is described in parentheses.

Expanded: MFL110CAL (Matsumoto Yushi-Seiyaku)

Expandable 1: Expancel 031DU40 (Nouryon, shell: copolymer of acrylate and acrylonitrile, average particle size: 10-16 μm, expansion begins at 80-95° C., maximum expansion is reached at 120-135° C.)

Expandable 2: F-AC170D (Matsumoto Yushi-Seiyaku, shell: copolymer of acrylate, average particle size: 20-35 μm, expansion begins at 155-165° C., maximum expansion is reached at 175-185° C.)

Azo: 2,2'-azobis(2-methylpropionamidine)dihydrochloride (wako, V-50)

Micro CaCO₃: Calcium carbonate with a particle diameter of 1 to 100 μm

Example 28

A super absorbent polymer films was prepared in the same manner as in Example 19, except that no foaming agent was added during the preparation of the monomer composition.

Example 29

A super absorbent polymer films was prepared in the same manner as in Example 21, except that no foaming agent was added during the preparation of the monomer composition.

TABLE 6

| | | | | Degree of neutral- | Internal cross- | | Moisturizing | | | Thickness of monomer |
| | Type of foaming agent (wt % in parentheses) | Viscosity (mPa · s)[1] | TSC (%) | ization of monomer (%) | linking agent (ppm) [2] | Thickner (parts by weight)[3] | agent (parts by weight)[4] | Photo- initiator (ppm) [2] | Thermal initiator (ppm) [2] | composition film (mm) |
|---|---|---|---|---|---|---|---|---|---|---|
| Ex. 19 | Expanded (1) | 902 | 40 | 70 | 2000 | 0.85 | 40 | 80 | 1000 | 0.1 |
| Ex. 20 | Expandable 1(1) | 902 | 40 | 70 | 2000 | 0.85 | 40 | 80 | 1000 | 0.1 |
| Ex. 21 | Expandable 1(1) | 1383 | 54 | 70 | 500 | 0.75 | 40 | 80 | 1000 | 0.3 |
| Ex. 22 | Expandable 1(1) | 1383 | 54 | 70 | 500 | 0.75 | 40 | 80 | 1000 | 0.4 |
| Ex. 23 | Expandable 2(1) | 11700 | 54 | 70 | 1000 | 1 | 40 | 80 | 1000 | 0.2 |
| Ex. 24 | Expandable 2(1) & Micro CaCO$_3$(1) | 6380 | 54 | 70 | 1000 | 1 | 40 | 80 | 1000 | 0.4 |
| Ex. 25 | Expandable 2(1) & Micro CaCO$_3$(2) | 7780 | 54 | 70 | 1000 | 1 | 40 | 80 | 1000 | 0.2 |
| Ex. 26 | Azo (0.5) | 10160 | 54 | 70 | 1000 | 1 | 40 | 80 | 1000 | 0.2 |
| Ex. 27 | Expandable 2(1) & Azo (0.5) | 10290 | 54 | 70 | 1000 | 1 | 40 | 80 | 1000 | 0.2 |
| Ex. 28 | Not added | 902 | 40 | 70 | 2000 | 0.85 | 40 | 80 | 1000 | 0.1 |
| Ex. 29 | Not added | 1383 | 54 | 70 | 500 | 0.75 | 40 | 80 | 1000 | 0.3 |

[1]TOKI Viscometer (TV-22), 1 rpm, Rotor # 1
[2] Content in total weight of monomer composition
[3]Content in 100 parts by weight of solid content in monomer composition
[4]Content based on 100 parts by weight of acrylic acid The following Table 7 shows the results of measuring the moisture content, initial absorption rate, CRC, and EC of the super absorbent polymer films of Examples 19 to 29, and the following Table 8 shows the result of measuring the expansion anisotropy of the super absorbent polymers of Example 19 and Example 28.

The super absorbent polymer films of Examples 19 to 27 are thin and flexible films having a plurality of pores with a diameter of about 10 to 500 μm therein. As shown in the tables below, the super absorbent polymer films of Examples 19 to 27 were confirmed to have excellent basic absorption properties such as centrifugal retention capacity and low extractable contents. In addition, when comparing Example 19 and Example 28, and Example 21 and Example 29, it was confirmed that using the foaming agent could significantly improve the initial absorbency while having similar water retention capacity. However, it could be seen from Table 8 that physical properties of the super absorbent polymer film, such as expansion anisotropy, were not impaired by foaming.

TABLE 7

| | Thickness of super absorbent polymer film (mm) | Moisture content (%) | Initial absorption rate (s) | CRC (g/g) | EC (%) |
|---|---|---|---|---|---|
| Ex. 19 | 0.13 | 9.4 | 47 | 25.5 | 14.7 |
| Ex. 20 | 0.15 | 9.9 | 52 | 20.1 | 15.9 |
| Ex. 21 | 0.4 | 9.7 | 130 | 28.1 | 26.2 |
| Ex. 22 | 0.5 | 9.1 | 150 | 21.6 | 20.2 |
| Ex. 23 | 0.3 | 9.2 | 65 | 28.5 | 27.7 |
| Ex. 24 | 0.75 | 9.9 | 150 | 21.9 | 9 |
| Ex. 25 | 0.32 | 9.4 | 68 | 24.7 | 4.4 |
| Ex. 26 | 0.35 | 9.6 | 81 | 22.6 | 20.5 |
| Ex. 27 | 0.33 | 9.5 | 71 | 24.4 | 25.1 |
| Ex. 28 | 0.09 | 9.5 | 87 | 27.4 | 7 |
| Ex. 29 | 0.21 | 9.4 | 250 | 21.5 | 32.2 |

TABLE 8

| | Ex. 19 | | | Ex. 28 | | |
|---|---|---|---|---|---|---|
| | Before swelling | After swelling | Expansion ratio | Before swelling | After swelling | Expansion ratio |
| Weight (mg) | 10.7 | 224.7 | — | 8.9 | 186.9 | — |
| Horizontal width (cm) | 1 | 2.26 | 2.26 | 1 | 2.2 | 2.2 |
| Vertical width (cm) | 1 | 2.26 | | 1 | 2.2 | |
| Thickness (μm) | 67 | 275.5 | 4.11 | 78 | 338.4 | 4.34 |
| Expansion anisotropy | | 1.82 | | | 1.97 | |

Example 30

A surface cross-linking solution was prepared by adding ethylene glycol diglycidyl ether (EJ-1030, manufactured by JSI), polypropylene glycol (PG), and polyacrylic acid-poly-ethylene oxide comb polymer (GK) to distilled water, followed by stirring at room temperature (25° C.). At this time, 0.09 wt % of EJ-1030, 0.06 wt % of PG, and 0.06 wt % of GK were included based on 100 wt % of the surface cross-linking solution.

Subsequently, the super absorbent polymer film prepared in Example 2 was immersed in the prepared surface cross-linking solution for 1 second, and then dried at 100° C. for 30 minutes to perform surface modification.

Examples 31 and 32

A surface cross-linked super absorbent polymer film was prepared in the same manner as in Example 30, except that the composition of the surface cross-linking solution was changed as shown in Table 9 below.

In Table 9 below, the amount of surface cross-linking agent treated means the amount of surface cross-linking agent applied to the surface of the super-absorbent polymer film, and is a value obtained by multiplying the amount of surface cross-linking solution absorbed per unit area (120 $g/m^2$) when the super absorbent polymer film is immersed in the surface cross-linking solution for 1 second by the content (%) of A+B in the surface cross-linking solution.

The amount of surface cross-linking solution absorbed per unit area when the super absorbent polymer film is immersed in the surface cross-linking solution for 1 second was measured by first measuring the mass of the super absorbent polymer film (10 cm×10 cm) before surface cross-linking, and then measuring the mass of the super absorbent polymer film after immersion in the surface cross-linking solution to determine the increased mass. After measuring it for 10 samples in total, an average value thereof was calculated and derived. At this time, when the super absorbent polymer film was immersed in the surface cross-linking solution for 1 second, the amount of surface cross-linking solution absorbed per unit area was found to be 120 $g/m^2$ regardless of the composition of the surface cross-linking solution.

TABLE 9

| | Content in surface cross-linking solution (wt %) | | | | Amount of surface cross-linking agent treated $(g/m^2)$ |
|---|---|---|---|---|---|
| | A (EJ-1030) | B (PG) | C (GK) | A + B | |
| Ex. 30 | 0.09 | 0.06 | 0.06 | 0.15 | 0.18 |
| Ex. 31 | 0.18 | 0.12 | 0.12 | 0.30 | 0.36 |
| Ex. 32 | 0.36 | 0.24 | 0.24 | 0.60 | 0.72 |

The following Table 10 shows the results of measuring the thickness, the moisture content, CRC, EC, AUP, total light transmittance, and yellow index of the super absorbent polymer films of Example 2 and Examples 30 to 32. Referring to Table 10, it was confirmed that the surface-modified super absorbent polymer film had improved absorbency under pressure and further reduced extractable contents compared to the super absorbent polymer film before surface modification, while exhibiting excellent centrifugal retention capacity.

TABLE 10

| | Ex. 2 | Ex. 30 | Ex. 31 | Ex. 32 |
|---|---|---|---|---|
| Thickness of super absorbent polymer film after surface cross-linking (mm)* | 0.1 | 0.1 | 0.1 | 0.1 |
| Moisture content (%) | 10 | 9 | 9 | 9 |
| CRC (g/g) | 33 | 30 | 25.6 | 22.4 |
| EC (%) | 12.9 | 3 | 1.9 | 1.1 |
| AUP (g/g) | 5 | 13.1 | 12.7 | 11.4 |
| Total light transmittance (%) | 92.1 | 91.1 | 90.8 | 90.1 |
| Yellow index | 1.08 | 1.11 | 1.18 | 1.2 |

The invention claimed is:

1. A method for preparing a super absorbent polymer film, comprising the steps of:
    preparing a monomer composition by mixing an acrylic acid-based monomer having at least partially neutralized acidic groups, a cellulose-based thickener, a moisturizing agent, a polymerization initiator, and a solvent;

casting the monomer composition on a substrate to form a monomer composition film;
    forming a hydrogel polymer film by irradiating heat and/or light while drawing the monomer composition film; and
    drying the hydrogel polymer film.

2. The method for preparing a super absorbent polymer film of claim 1,
    wherein the monomer composition further contains an internal cross-linking agent.

3. The method for preparing a super absorbent polymer film of claim 1,
    wherein the cellulose-based thickener is at least one selected from the group consisting of nanocellulose, hydroxyethylcellulose, hydroxypropylcellulose, hydroxyethylmethylcellulose, hydroxypropylmethyl-cellulose, and sodium carboxymethylcellulose.

4. The method for preparing a super absorbent polymer film of claim 1,
    wherein the moisturizing agent is at least one selected from the group consisting of glycerin;
    diglycerin; ethylene glycol; propylene glycol; butylene glycol; sorbitol; polyethylene glycol; polyglycerin-3; polyglycerin-6; polyglycerin-10; an ester compound of polyglycerin-10 and a C3 to C18 saturated fatty acid; citric acid; triethyl citrate; methyl citrate; sodium citrate; and trisodium 2-methylcitrate.

5. The method for preparing a super absorbent polymer film of claim 1,
    wherein the cellulose-based thickener is contained in an amount of 0.01 to 5 parts by weight based on 100 parts by weight of the solid content in the monomer composition.

6. The method for preparing a super absorbent polymer film of claim 1,
    wherein the moisturizing agent is contained in an amount of 5 to 70 parts by weight based on 100 parts by weight of the acrylic acid-based monomer.

7. The method for preparing a super absorbent polymer film of claim 1,
    wherein the monomer composition further contains a polyether-modified siloxane-based surfactant having a polyethylene oxide group and/or a polypropylene oxide group.

8. The method for preparing a super absorbent polymer film of claim 1,
    wherein the monomer composition further contains at least one foaming agent selected from the group consisting of expandable microsphere, expanded microsphere, an azo compound, and an inorganic foaming agent.

9. The method for preparing a super absorbent polymer film of claim 1,
    wherein the monomer composition has a viscosity at 25° C. of 100 mPa·s or more.

10. The method for preparing a super absorbent polymer film of claim 1,
    wherein the monomer composition film has a moisture content of 30 wt % to 60 wt %.

11. The method for preparing a super absorbent polymer film of claim 1,
    wherein tension applied to the monomer composition film in the step of forming the hydrogel polymer film is 40 to 100 N/m.

12. The method for preparing a super absorbent polymer film of claim 1, wherein the step of forming the hydrogel polymer film is performed at a temperature of 40 to 90° C., and the drying step is performed at a temperature of 80 to 150° C.

13. The method for preparing a super absorbent polymer film of claim 1, wherein the super absorbent polymer film obtained after the drying step has a moisture content of 15% or less.

14. The method for preparing a super absorbent polymer film of claim 1, after the drying step, further comprising the steps of:

applying a surface cross-linking solution containing a surface cross-linking agent to a surface of the super absorbent polymer film; and performing surface modification by heating the super absorbent polymer film coated with the surface cross-linking solution.

15. The method for preparing a super absorbent polymer film of claim 14, wherein an amount of the surface cross-linking agent applied to the surface of the super absorbent polymer film is 0.05 g/m² to 2.0 g/m².

16. The method for preparing a super absorbent polymer film of claim 2, wherein the internal cross-linking agent is contained in a concentration of 10 ppm to 3000 ppm with respect to the monomer composition.

17. The method for preparing a super absorbent polymer film of claim 7, wherein the polyether-modified siloxane-based surfactant is contained in an amount of 0.05 to 0.5 parts by weight based on 100 parts by weight of the monomer composition.

18. The method for preparing a super absorbent polymer film of claim 8, wherein the foaming agent is contained in an amount of 0.1 to 10 parts by weight, based on 100 parts by weight of the monomer composition.

19. The method for preparing a super absorbent polymer film of claim 14, wherein the surface cross-linking agent is contained in an amount of 0.1 wt % to 1.5 wt % based on 100 wt % of the surface cross-linking solution.

20. The method for preparing a super absorbent polymer film of claim 1, wherein the super absorbent polymer film prepared has a thickness of 0.001 to 0.8 mm, and the pore size of about 10 to 500 μm.

* * * * *